(12) United States Patent
Yamashita

(10) Patent No.: US 9,167,142 B2
(45) Date of Patent: Oct. 20, 2015

(54) IMAGING APPARATUS AND METHOD FOR CONTROLLING THE SAME

(75) Inventor: Tomoya Yamashita, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/454,863

(22) Filed: Apr. 24, 2012

(65) Prior Publication Data

US 2012/0274802 A1 Nov. 1, 2012

(30) Foreign Application Priority Data

Apr. 28, 2011 (JP) ................................. 2011-101316

(51) Int. Cl.
| | |
|---|---|
| H04N 5/232 | (2006.01) |
| H04N 5/235 | (2006.01) |
| H04N 5/262 | (2006.01) |
| H04N 5/77 | (2006.01) |
| H04N 9/804 | (2006.01) |

(52) U.S. Cl.
CPC ............. *H04N 5/232* (2013.01); *H04N 5/235* (2013.01); *H04N 5/23245* (2013.01); *H04N 5/23293* (2013.01); *H04N 5/2625* (2013.01); *H04N 5/772* (2013.01); *H04N 9/8047* (2013.01); *H04N 5/23209* (2013.01)

(58) Field of Classification Search
CPC ..... H04N 5/232; H04N 5/772; H04N 9/8047; H04N 5/23245; H04N 5/235; H04N 5/23293; H04N 5/2625; H04N 5/23209

USPC ............................................... 348/222.1, 239
See application file for complete search history.

(56) References Cited

U.S. PATENT DOCUMENTS

| | | | | |
|---|---|---|---|---|
| 2009/0021594 | A1* | 1/2009 | Tsuda et al. | 348/222.1 |
| 2010/0295961 | A1* | 11/2010 | Terauchi | 348/222.1 |

FOREIGN PATENT DOCUMENTS

| | | |
|---|---|---|
| CN | 1565119 A | 1/2005 |
| CN | 1700299 A | 11/2005 |
| CN | 101399925 A | 4/2009 |
| CN | 101588446 A | 11/2009 |
| CN | 101588452 A | 11/2009 |
| EP | 1814315 A1 | 8/2007 |
| JP | 2003-125266 A | 4/2003 |
| JP | 2003-179798 A | 6/2003 |
| JP | 2006-352229 A | 12/2006 |

* cited by examiner

*Primary Examiner* — Twyler Haskins
*Assistant Examiner* — Angel L Garces-Rivera
(74) *Attorney, Agent, or Firm* — Canon USA, Inc., IP Division

(57) ABSTRACT

An imaging apparatus includes a control unit configured to perform control to record an uncombined image captured in a multiple exposure shooting mode on a recording medium, and, if the number of images to be combined to generate a multiple combined image is one when the multiple exposure shooting mode ends, to prevent the multiple combined image from being generated or recorded.

10 Claims, 14 Drawing Sheets

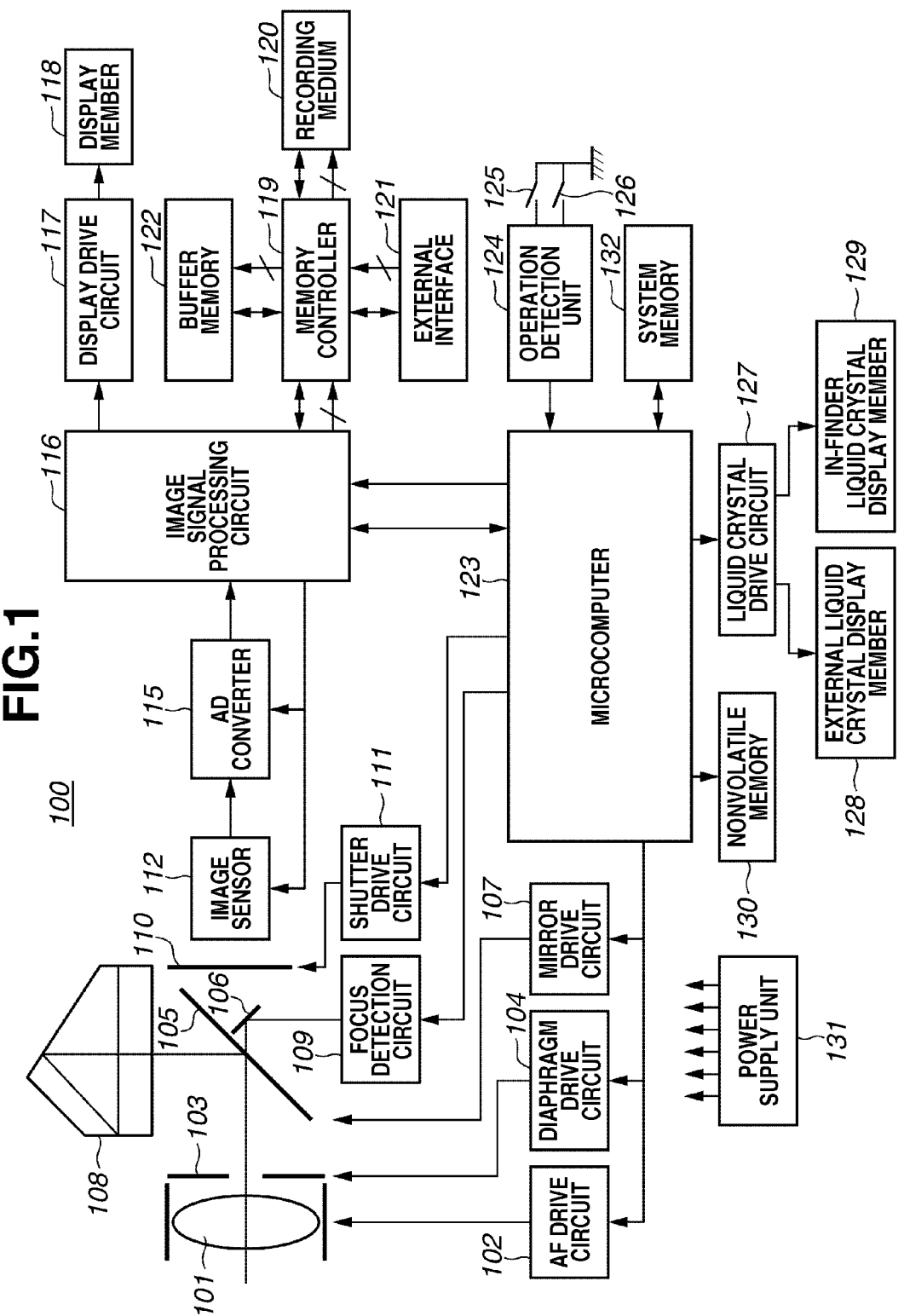

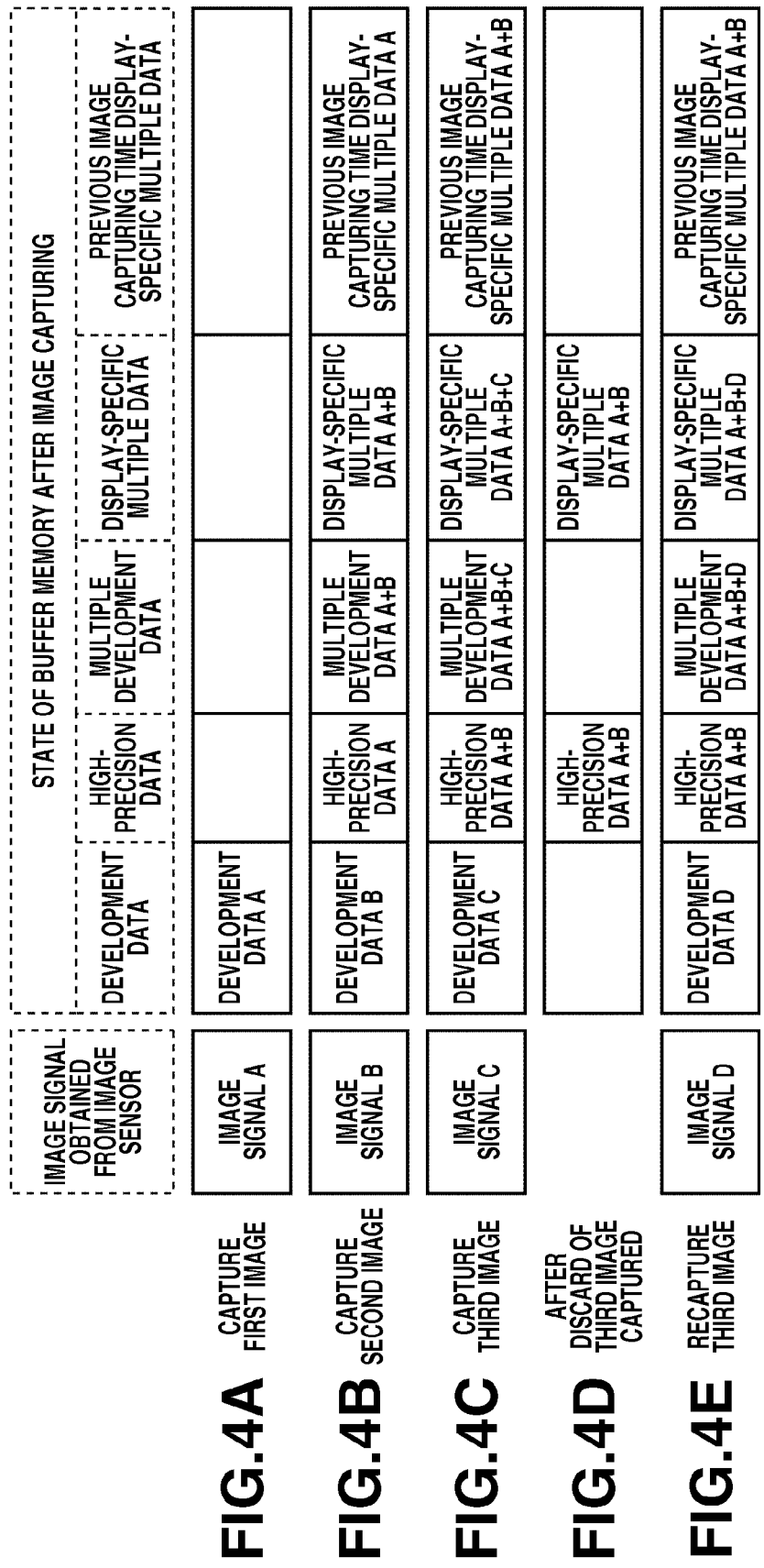

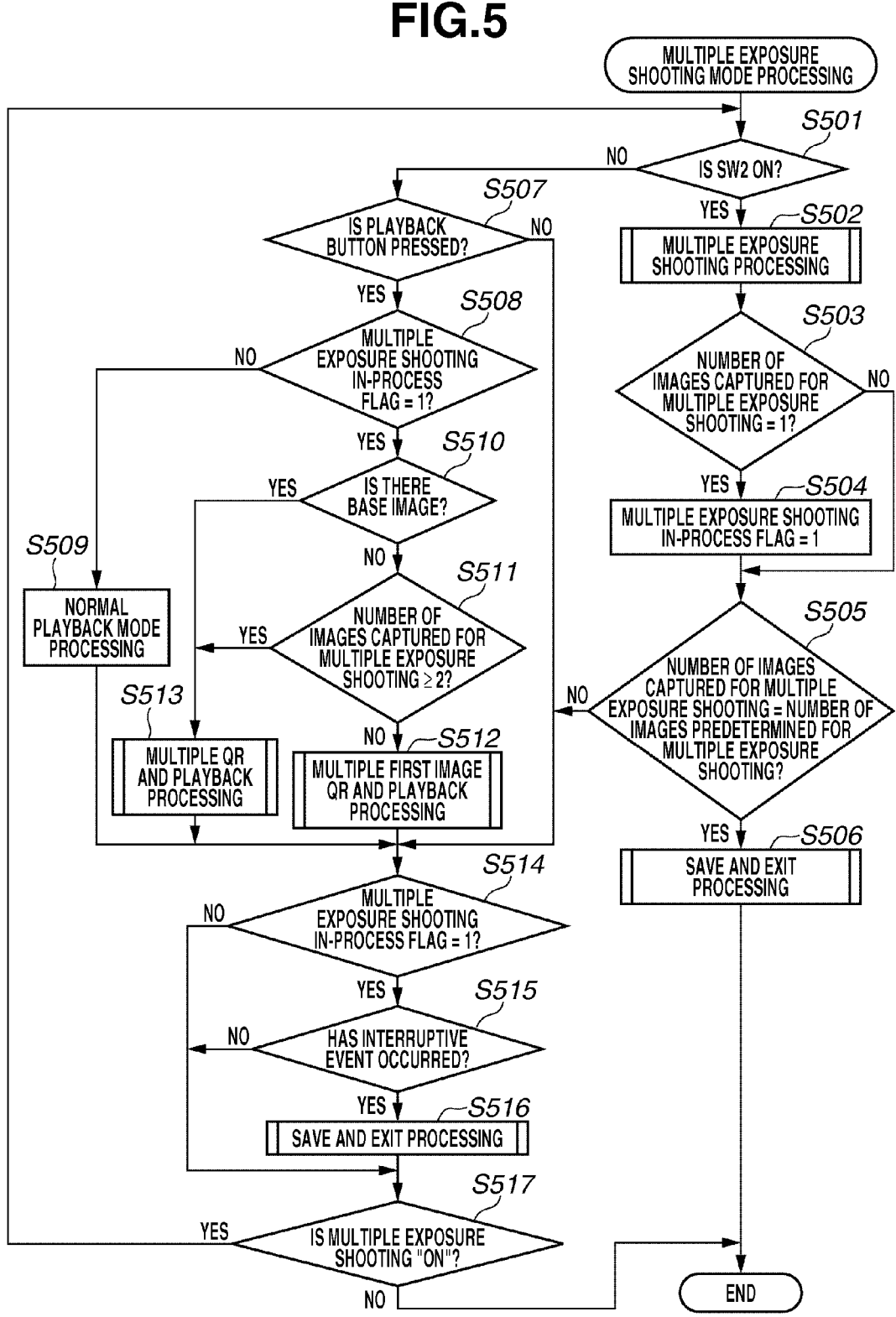

1005 1001 1002 1003 1004

IMAGING APPARATUS AND METHOD FOR CONTROLLING THE SAME

BACKGROUND OF THE INVENTION

1. Field of the Invention

The present invention relates to an imaging apparatus, and more particularly to an imaging apparatus that can multiple combine a plurality of captured images.

2. Description of the Related Art

There has conventionally been a technology of performing multiple exposure shooting through addition processing of a plurality of digital image signals. Japanese Patent Application Laid-Open No. 2006-352229 discusses a method for separately generating and saving respective captured images captured for multiple exposure shooting and a multiple image into which all the captured images are superimposed. According to Japanese Patent Application Laid-Open No. 2006-352229, images are combined based on raw data on frames captured by the time when imaging of a set number of frames is completed or when multiple exposure is interrupted. The resulting multiple combined image (multiple exposure shooting image) and the captured images (original images) are then recorded on a recording medium.

If multiple exposure shooting is interrupted, the number of images to be combined can sometimes be only one. In such a case, according to Japanese Patent Application Laid-Open No. 2006-352229, combination is performed based on a single original image captured so far, and the resulting multiple combined image and the original image are recorded on a recording medium. Since the multiple combined image and the original image are substantially the same, there are recorded the same two images. This is a waste of the capacity of the recording medium.

SUMMARY OF THE INVENTION

The present invention is directed to an imaging apparatus that does not waste a capacity of a recording medium when multiple exposure shooting ends with a small number of images captured.

According to an aspect of the present invention, an imaging apparatus includes a first recording control unit configured to perform control to record an uncombined image captured in a multiple exposure shooting mode on a recording medium, a generation unit configured to combine an image or images captured in the multiple exposure shooting mode to generate a multiple combined image to be recorded on the recording medium, a second recording control unit configured to perform control to record the multiple combined image on the recording medium, and a control unit configured to, if the number of images to be combined by the generation unit is "1" when the multiple exposure shooting mode ends, perform control to prevent the generation unit from generating the multiple combined image or to prevent the second recording control unit from recording the multiple combined image, wherein the first recording control unit is configured to perform control to record the uncombined image regardless of whether to generate the multiple combined image or whether to record the multiple combined image.

According to an exemplary embodiment of the present invention, a capacity of a recording medium can be prevented from being wasted when multiple exposure shooting ends with a small number of images captured.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a configuration block diagram illustrating a digital camera according to an exemplary embodiment of the present invention.

FIGS. 4A, 4B, 4C, 4D, and 4E are diagrams illustrating image data stored in a buffer memory during multiple exposure shooting.

FIG. 5 is a flowchart illustrating multiple exposure shooting mode processing.

DESCRIPTION OF THE EMBODIMENTS

Figure 2A:
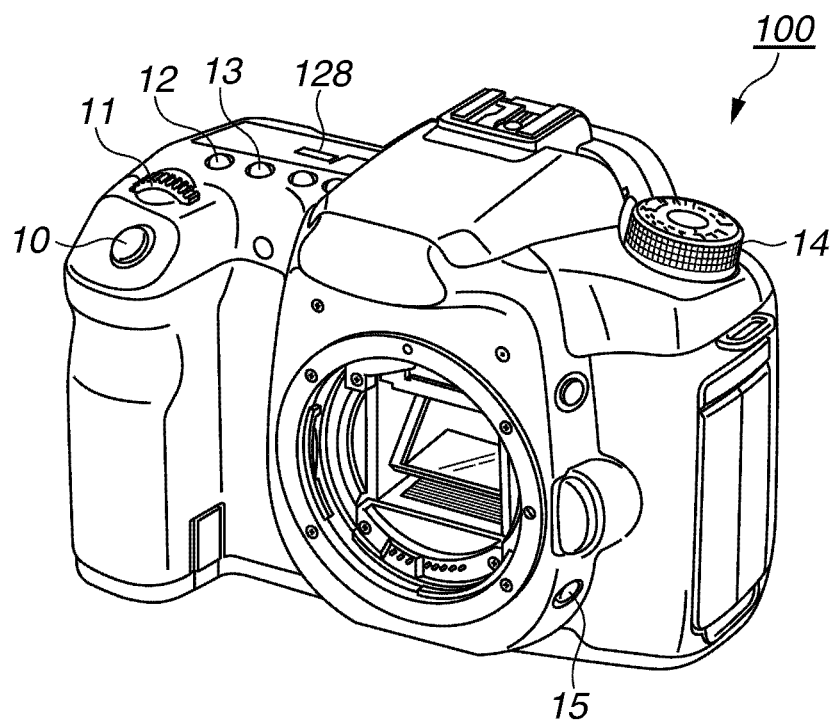
FIGS. 2A and 2B are external views of the digital camera.

Various exemplary embodiments, features, and aspects of the invention will be described in detail below with reference to the drawings.

FIG. 1 is a block diagram illustrating the configuration of a digital camera 100, which serves as an imaging apparatus according to an exemplary embodiment of the present invention.

In FIG. 1, a photographic lens 101 is a detachably-attached interchangeable lens, which includes a zoom lens and a focus lens.

An autofocus (AF) drive circuit 102 includes a direct-current (DC) motor or a stepping motor, for example. The AF drive circuit 102 changes the position of a focus lens included in the photographic lens 101 for focusing under control of a microcomputer 123.

A diaphragm drive circuit 104 drives a diaphragm 103. The microcomputer 123 calculates the amount of driving, and the diaphragm drive circuit 104 changes an optical aperture value.

A main mirror 105 is a mirror for switching a light flux incident from the photographic lens 101 to between a finder side and an image sensor 112 side. The main mirror 105 is arranged to reflect the light flux toward a finder unit when in a normal condition. When performing photographing and during a live view display, the main mirror 105 is flipped up and retracted out of the light flux so that the light flux is introduced to the image sensor 112. The main mirror 105 is configured as a half mirror so that some of the light can be transmitted through a center area. Some of the light flux is transmitted and made incident on a sensor for focus detection.

A sub mirror 106 is a mirror for reflecting a light flux transmitted through the main mirror 105 toward the sensor intended for focus detection (which is included in a focus detection circuit 109).

A mirror drive circuit 107 drives the main mirror 105 under control of the microcomputer 123.

A pentagonal prism 108 constitutes a finder. The finder also includes a focusing screen and an eyepiece lens (not illustrated).

The focus detection circuit 109 is a block intended for focus detection. A sensor for photoelectric conversion is arranged inside the focus detection circuit 109. The light flux that is transmitted through the center area of the main mirror 105 and reflected by the sub mirror 106 reaches the sensor for photoelectric conversion. The sensor output can be calculated to determine a defocus amount for use in focus calculation. The microcomputer 123 evaluates the result of calculation and instructs the AF drive circuit 102 to drive the focus lens.

A shutter drive circuit 111 drives a focal plane shutter 110. The microcomputer 123 controls an opening time of the focal plane shutter 110.

Examples of the image sensor 112 include a charge-coupled device (CCD) sensor and a complementary metal oxide semiconductor (CMOS) sensor. The image sensor 112 converts an object image formed by the photographic lens 101 into an electrical signal.

An analog-to-digital (A/D) converter 115 converts an analog output signal output from the image sensor 112 into a digital signal.

An image signal processing circuit 116 is implemented by logic devices such as a gate array. The image signal processing circuit 116 performs various types of image signal processing.

A display drive circuit 117 is a drive circuit that causes a display member 118 to produce a display.

The display member 118 is a display such as a thin-film transistor (TFT) liquid crystal display and an organic electroluminescence (EL) display. In the present exemplary embodiment, the display member 118 is implemented as a rear monitor of the digital camera 100.

A memory controller 119 stores unprocessed digital image data input from the image signal processing circuit 116 into a buffer memory 122, and stores processed digital image data into a recording medium 120. The memory controller 119 outputs image data from the buffer memory 122 and the recording medium 120 to the image signal processing circuit 116. The memory control 119 can output an image or images stored in the recording medium 120 through an external interface 121, which is connectable to a computer.

The recording medium 120 is a removable recording medium such as a memory card. The recording medium 120 may be a built-in recording medium of the digital camera 100. A plurality of recording media may be used.

The external interface 121 is an interface for establishing connection with an external device such as a computer by wired or wireless communications.

The buffer memory 122 is a memory for temporarily retaining image data. Various images used in the process of multiple exposure shooting are also stored in the buffer memory 122.

The image signal processing circuit 116 performs filter processing, color conversion processing, and gamma processing on a digitized image signal to generate development data. The image signal processing circuit 116 also performs Joint Photographic Experts Group (JPEG) or other compressing processing and outputs the result to the memory controller 119.

The image signal processing circuit 116 can add two or more pieces of development data on the buffer memory 122, generate high-precision data with increased gradation bits from development data, or simultaneously perform both the processes, and write the result back to the buffer memory 122. The image signal processing circuit 116 can also output an image signal from the image sensor 112 and/or an image signal reversely input from the memory controller 119 to the display member 118 through the display drive circuit 117. The image signal processing circuit 116 switches such functions based on an instruction from the microcomputer 123. The image signal processing circuit 116 can output information to the microcomputer 123 if needed. Examples of the information include exposure information on the signal of the image sensor 112 and information on white balance. Based on such pieces of information, the microcomputer 123 issues instructions as to white balance and a gain adjustment. In a continuous shooting operation, shot data is once stored into the buffer memory 122 as unprocessed images. The image signal processing circuit 116 reads the unprocessed image data through the memory controller 119, and performs image processing and compression processing for continuous shooting. The number of shots in continuous shooting depends on the capacity of the buffer memory 122.

The microcomputer 123 is a main control unit for controlling the entire digital camera 100. The microcomputer 123 executes various types of programs recorded on a nonvolatile memory 130 by using a system memory 132 as a work memory.

An operation detection unit 124 detects that an operation member is operated. If the operation member is operated, the operation detection unit 124 informs the microcomputer 123 of that state. The microcomputer 123 controls various components according to the change of the operation member. The operation detection unit 124 is capable of detecting the open/close state of a lid of a slot where the recording medium 120 is accommodated (hereinafter, referred to as a card lid) and the open/close state of a battery lid.

An example of the operation member is a release button 10. A switch 1 (hereinafter, referred to as SW1) 125 is a switch that is turned ON by a half press operation of the release button 10. If the SW1 125 is ON, the microcomputer 123 performs shooting preparation processes such as an AF operation and a light metering operation.

A switch 2 (hereinafter, referred to as SW2) 126 is a switch that is turned ON by a full press operation of the release button 10. If the SW2 126 is ON, the microcomputer 123 performs an actual shooting process of capturing an image and recording the captured image on the recording medium 120 as an image file.

A continuous shooting operation is performed while the SW1 125 and the SW2 126 remain ON.

A liquid crystal drive circuit 127 drives an external liquid crystal display member 128 and an in-finder liquid crystal display member 129 according to display contents and commands from the microcomputer 123. The external liquid crystal display member 128 and the in-finder liquid crystal display member 129 display operation statuses and messages by using characters and/or graphics. The in-finder liquid crystal display member 129 includes a not-illustrated backlight such as a light-emitting diode (LED). The liquid crystal drive circuit 127 also drives the LED.

Parameters such as an International Organization for Standardization (ISO) sensitivity, an image size, and image quality are set in advance of shooting. The microcomputer 123 can check the remaining capacity of the recording medium 120 through the memory controller 119, and calculate the number of shots available based on predicted value data on an image size according to the set parameters. The number of shots available may be displayed on the display member 118, the external liquid crystal display member 128, and/or the in-finder liquid crystal display member 129 if needed.

Examples of the nonvolatile memory 130 include an electrically erasable programmable read-only memory (EEPROM) and a flash memory. The nonvolatile memory 130 can retain data even when the digital camera 100 is not powered on. A power supply unit 131 provides a necessary power supply to the foregoing blocks and drive systems.

Figure 2B:
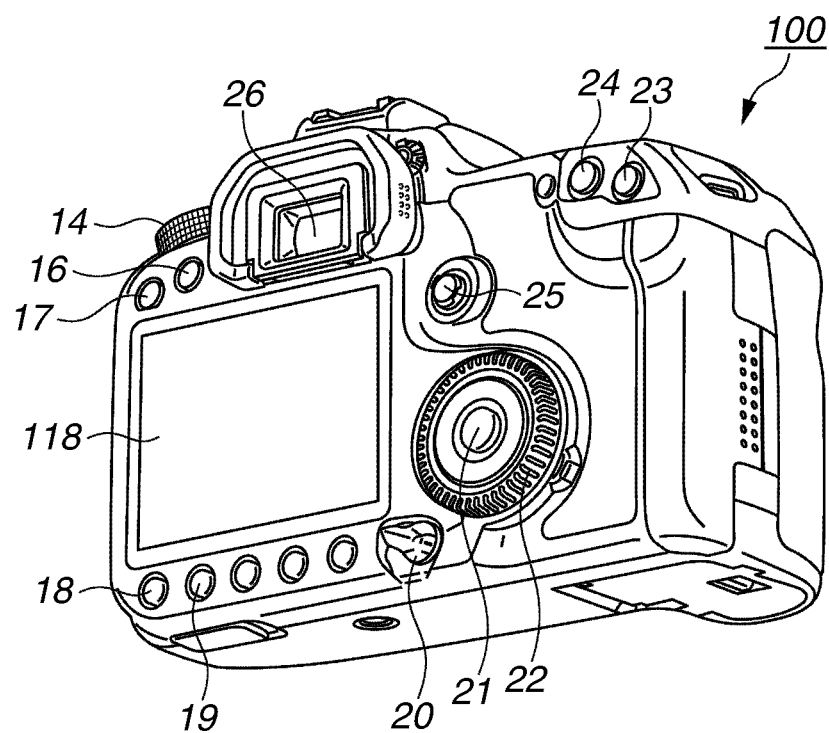

FIGS. 2A and 2B illustrate external views of the digital camera 100. FIG. 2A is a front perspective view of the digital camera 100. FIG. 2B is a rear perspective view of the digital camera 100. The front perspective view illustrates the digital camera 100 with the photographic lens 101, an interchangeable lens, dismounted.

As illustrated in FIG. 2A, the digital camera 100 has operation members including the release button 10, a main electronic dial 11, an ISO setting button 12, an exposure compensation button 13, a shooting mode dial 14, and an aperture reducing button 15. The aperture reducing button 15 is a button for reducing the diaphragm 103 to a set aperture stop value (F value). The user can press the aperture reducing button 15 to check the brightness of a captured image through the set aperture during a live view display in a shooting mode. A live view display refers to a continuous display of images being captured by the image sensor 112 on the display member 118 generally in real time, with the main mirror 105 retracted. Such a display, or a through display, makes the display member 118 function as an electronic viewfinder. The main electronic dial 11 is a rotating operation member. The main electronic dial 11 is used for operations such as increasing and decreasing various set values including a photographing condition, changing a selected item when selecting various items, and switching images in units of groups when in a playback mode.

As illustrated in FIG. 2B, the digital camera 100 has operation members including an information display button 16, a menu button 17, a playback button 18, a delete button 19, a main switch 20, and a set button 21. The digital camera 100 also has a sub electronic dial 22, a zoom-in button 23, a zoom-out button 24, and a multi controller 25. The main switch 20 is an operation member for powering ON/OFF the digital camera 100. The sub electronic dial 22 is a rotating operation member. The sub electronic dial 22 is used for operations such as changing a selected item when selecting various items, and switching images to display when in a playback mode. An eye-side finder unit 26 is an eyepiece unit through which the user looks into a viewfinder and views an optical image.

Next, a method of setting preset items as to multiple exposure shooting will be described.

Figure 3A:
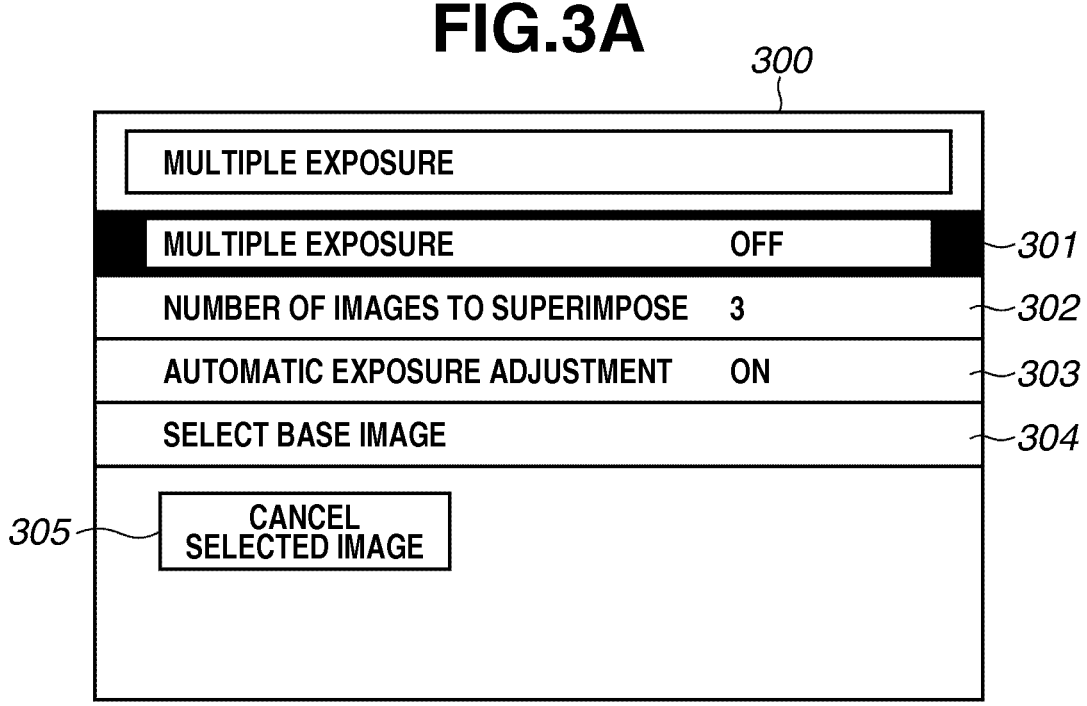
FIGS. 3A and 3B are diagrams illustrating display examples of a presetting menu screen for multiple exposure shooting.
Figure 3B:
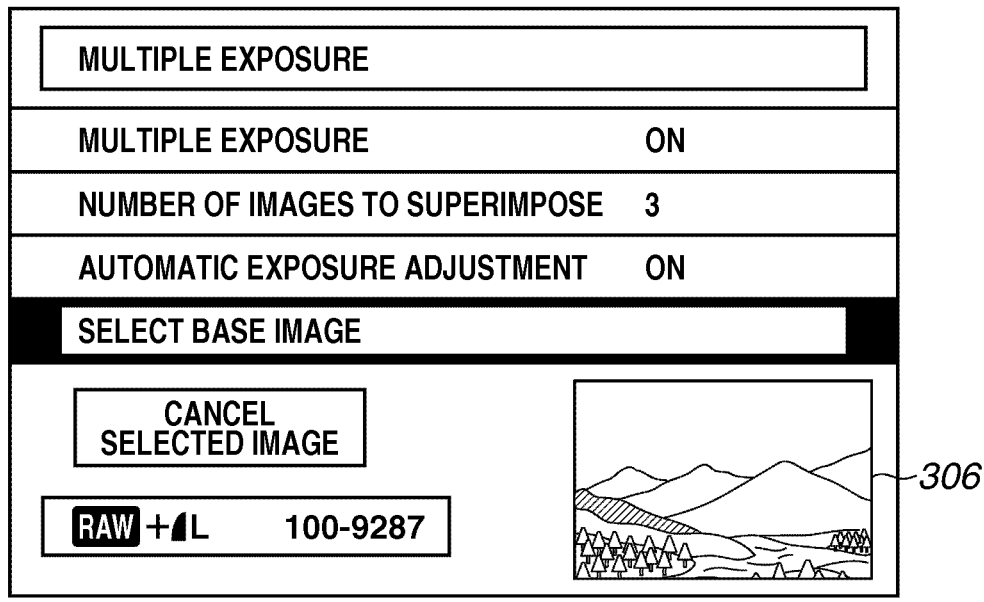

FIGS. 3A and 3B illustrate display examples of a menu screen for making settings of the digital camera 100 as to multiple exposure shooting. A menu screen 300 as to multiple exposure shooting illustrated in FIG. 3A appears on the display member 118 when the user presses the menu button 17 to display a general menu, selects a menu for multiple exposure shooting from the general menu, and confirms the selection.

The menu screen 300 displays menu items 301 to 304. The user can operate the sub electronic dial 22 to select any of the menu items 301 to 304. When the user presses the set button 21 with any one of the menu items selected, a list of setting candidates for the selected menu item is displayed. The user can operate the sub electronic dial 22 or make other operations to select a desired setting candidate from the displayed list of setting candidates, and press the set button 21 again to confirm and set the selected setting candidate as a set value.

The menu item 301 is a menu item for selecting whether to perform multiple exposure shooting. Either one of two setting candidates "on" and "off" can be selected and set. Hereinafter, the setting of the present menu item 301 will be referred to as a multiple exposure shooting necessity setting. The multiple exposure shooting necessity setting is recorded in the system memory 132 or the nonvolatile memory 130. If the multiple exposure shooting necessity setting is changed from "off" to "on" according to a user operation, the digital camera 100 starts multiple exposure shooting at the next image capturing. The multiple exposure shooting necessity setting is automatically changed from "on" to "off" under several conditions to be described below, such as when multiple exposure shooting has reached a predetermined number of shots and has ended. If the menu item 301 is set to "off" according to a user operation in a multiple exposure shooting in-process state to be described below, the digital camera 100 ends the multiple exposure shooting at that point. Here, a multiple combined image file is generated if possible.

The menu item 302 is a menu item for selecting the number of images to be superimposed for a set of multiple exposure shots. The number of images can be selected and set from among setting candidates of 2 to 9. If a base image to be described below is not selected, the number of images set by the menu item 302 serves as the number of images predetermined for multiple exposure shooting. If a base image is selected, the number of images predetermined for multiple exposure shooting is the number of images selected by the menu item 302 minus one. The number of images predetermined for multiple exposure shooting is recorded in the system memory 132. It should be noted that the menu item 302 is not selectable to change if one or more images have been captured by multiple exposure shooting and the multiple exposure shooting is yet to be completed. Such a state will hereinafter be referred to as a multiple exposure shooting in-process state. In the multiple exposure shooting in-process state, a multiple exposure shooting in-process flag to be described below is set to 1.

The menu item 303 is a menu item for selecting whether an automatic exposure adjustment function needs to be performed in multiple exposure shooting. Either one of two setting candidates "on" and "off" can be selected and set. The present menu item 303 is not selectable to change in the multiple exposure shooting in-process state.

The menu item 304 is a menu item for selecting a base image for multiple exposure shooting. Any one of images recorded on the recording medium 120 can be selected and set as a base image. The present menu item 304 can be set only when the multiple exposure shooting necessity setting is set at "on" and the digital camera 100 is in a state other than the multiple exposure shooting in-process state. More specifically, a base image can be set by the menu item 304 only between when the multiple exposure shooting necessity setting is set at "on" and when the first image is captured. If a base image is set, the screen display changes to that illustrated in FIG. 3B. An image 306 is an image that is selected as a base image from among images recorded on the recording medium 120. The image signal processing circuit 116 reads a base image from the recording medium 120, converts the base image into development data, and loads the resulting development data into the buffer memory 122. When a base image is selected, the set value of an image size serving as a photographing condition (the image size of an image or images to be captured in the subsequent multiple exposure shooting) is set at the same value as the image size of the base image. The selection of a base image makes it possible to perform multiple exposure shooting with an image captured in the past as the first captured image. In the present exemplary embodiment, images that can be selected as a base image are limited to images previously captured by the digital camera 100 because the image sizes need to be matched. Images other than those captured by the digital camera 100 may be included as candidates for a base image if the images have image sizes that the digital camera 100 can set as a photographing condition. When multiple exposure shooting ends, the setting of a base image is cancelled and the digital camera 100 returns to the state where no base image is selected. A cancel selected image button 305 is a button icon for canceling a selected base image. When the cancel selected image button 305 is selected, the digital camera 100 immediately restores the state where no base image is selected.

Referring to FIGS. 4A to 4E, data retained in the buffer memory 122 during multiple exposure shooting will be described. Each time an image is captured, the buffer memory 122 retains up to five pieces of image data including development data, high-precision data, multiple development data, display-specific multiple data, and previous image capturing time display-specific multiple data.

Development data refers to data that is generated by applying development processing such as color processing to an image signal obtained from the image sensor 112 in the image capturing immediately before. The development data can be compressed in the JPEG format to generate an image file of an original image to be recorded on the recording medium 120.

For the purpose of multiple combination, development data obtained by the previous image capturing is subjected to the image signal processing circuit 116 for bit enhancement (hereinafter, precision enhancement). High-precision data refers to the bit-enhanced image data that is added to high-precision data generated before. The precision enhancement can reduce the possibility that gradations may be saturated by multiple combination processing. Other processing that facilitates multiple combination may be applied aside from the precision enhancement.

Multiple development data is high-precision data currently generated (multiple-combined with an image or images obtained before) to which development data obtained by the current image capturing is added. The multiple development data can be compressed in the JPEG format to generate an image file of a multiple combined image to be recorded on the recording medium 120.

Display-specific multiple data is data that is generated by reducing and compressing multiple development data for display purpose. Such data is used to perform multiple quick review (hereinafter, also referred to as QR) and playback processing and multiple first image QR and playback processing to be described below.

Previous image capturing time display-specific multiple data is display-specific multiple data that has been generated by previous image capturing. A multiple image combination and a multiple image combination result image may refer to an image generated by superimposing, composing, synthesizing, or merging images by way of example and not of limitation. Multiple image combination and multiple image combination result image do not refer to synthesizing a plurality of images that are placed in a tile-arranged configuration such as is done for a panoramic effect. Multiple image combination and multiple image combination result image may be referred to as multiple-synthesize image, multiple-composite image, multiple image combination image, or multiple-composite image.

FIGS. 4A to 4E illustrate data retained in the buffer memory 122 in respective states without a base image.

FIG. 4A illustrates the state of the buffer memory 122 after the first image is captured. An image signal A is obtained by the capturing of the first image. The image signal A is developed into development data A, which is then retained in the buffer memory 122. Note that none of high-precision data, multiple development data, display-specific multiple data, and previous image capturing time display-specific multiple data is generated or stored, and as much free area is reserved in the buffer memory 122. Since as much capacity as needed to store high-precision data, multiple development data, display-specific multiple data, and previous image capturing time display-specific multiple data is left unused, the capacity may be allocated for other processing so that the other processing can be performed at high speed. Examples of the other processing include face detection processing using live view shooting, and contrast AF processing.

FIG. 4B illustrates the state of the buffer memory 122 after the second image is captured. An image signal B is obtained by the capturing of the second image. The image signal B is developed into development data B, which is then retained in the buffer memory 122. The development data A which has been retained since the capturing of the first image is enhanced in precision and retained as high-precision data A (no addition occurs because there has been no high-precision data retained after the first image). The high-precision data A and the development data B are multiple combined to generate multiple development data A+B, which is then retained in the buffer memory 122. The multiple development data A+B is reduced and compressed to generate display-specific multiple data A+B, which is then retained in the buffer memory 122. There is no display-specific multiple data generated when the first image is captured. When the second image is captured, previous image capturing time display-specific multiple data is thus generated from the image file of the first image A recorded on the recording medium 120. The generated previous image capturing time display-specific multiple data is then retained in the buffer memory 122.

FIG. 4C illustrates the state of the buffer memory 122 after the third image is captured. An image signal C is obtained by the capturing of the third image. The image signal C is developed into development data C, which is then retained in the buffer memory 122. The development data B which has been retained since the capturing of the second image is enhanced in precision. The result is added to the high-precision data A, which has been retained since the capturing of the second image, to generate high-precision data A+B. The generated high-precision data A+B is then retained in the buffer memory 122. The high-precision data A+B and the development data C are multiple combined to generate multiple development data A+B+C, which is then retained in the buffer memory 122. The multiple development data A+B+C is reduced and compressed to generate display-specific multiple data A+B+C, which is then retained in the buffer memory 122. The display-specific multiple data A+B, which is generated when the second image is captured, is retained as previous image capturing time display-specific multiple data A+B.

FIG. 4D illustrates the state of the buffer memory 122 when the image obtained by the third image capturing is discarded by multiple QR and playback processing to be described below. When the image obtained by the third image capturing is discarded, then the development data C, the multiple development data A+B+C, and the display-specific multiple data A+B+C are discarded from the buffer memory 122 of the state illustrated in FIG. 4C. The image data that is retained as the previous image capturing time display-specific multiple data A+B in FIG. 4C is retained as display-specific multiple data A+B in FIG. 4D.

FIG. 4E illustrates the state of the buffer memory 122 when the third image is recaptured after the third captured image is discarded. An image signal D is obtained by the recapturing of the third image (image capturing in a multiple exposure shooting mode after acceptance of a recapturing instruction). The image signal D is developed into development data D, which is then retained in the buffer memory 122. The high-precision data A+B which has been retained since the discard of the third image is retained unchanged. The high-precision data A+B and the development data D are multiple combined to generate multiple development data A+B+D, which is then retained in the buffer memory 122. The multiple development data A+B+D is reduced and compressed to generate display-specific multiple data A+B+D, which is then retained in the buffer memory 122. The display-specific multiple data A+B which has been retained since the discard of the third image is retained as previous image capturing time display-specific multiple data A+B.

Next, data used in the processing of multiple exposure shooting will be described. The processing of multiple exposure shooting is executed by using the following variables:

Multiple exposure shooting necessity setting: Can be set to either "on" or "off." The set value is recorded in the nonvolatile memory 130 or the system memory 132. The state "on" indicates a multiple exposure shooting mode.

Multiple exposure shooting in-process flag: A variable that indicates whether multiple exposure shooting is in process. This variable is recorded in the system memory 132. If the multiple exposure shooting necessity setting is set at "on" and one or more images are captured, the multiple exposure shooting in-process flag is 1 (multiple exposure shooting in-process state). If multiple exposure shooting ends, the multiple exposure shooting in-process flag is "0". Whether to perform normal quick review processing or multiple quick review processing is determined based on this flag.

Number of images predetermined for multiple exposure shooting: A value that indicates the number of times of multiple exposure shooting to be performed (hereinafter, referred to as a set of multiple exposure shots) for generating a multiple combined image. This value is recorded in the system memory 132. If no base image is set, the number of images predetermined for multiple exposure shooting is the number of images set via the menu item 302 illustrated in FIG. 3. If a base image is set, the number of images predetermined for multiple exposure shooting is the number of images set via the menu item 302 illustrated in FIG. 3 minus one.

Number of images captured for multiple exposure shooting: A value that indicates the number of images captured so far for a set of multiple exposure shots. This value is recorded in the system memory 132. If the number of images captured for multiple exposure shooting reaches the number of images predetermined for multiple exposure shooting, a set of multiple exposure shots ends. The multiple exposure shooting processing is thus completed.

In the multiple exposure shooting in-process state, information that indicates the storage location of each original image captured so far by a set of multiple exposure shots on the recording medium 120 is recorded in the system memory 132 as written file information. If there is a plurality of recording media to record images on, information that specifies the storing recording medium is also recorded.

FIG. 5 is a flowchart illustrating multiple exposure shooting mode processing. The processing illustrated in FIG. 5 is implemented by a program recorded in the nonvolatile memory 130 being loaded into the system memory 132 and executed by the microcomputer 123. The processing illustrated in FIG. 5 starts when the multiple exposure shooting necessity setting is set to "on."

In step S501, the microcomputer 123 determines whether the SW2 is ON. If the SW2 is ON (YES in step S501), the microcomputer 123 proceeds to step S502. If the SW2 is not ON (NO in step S501), the microcomputer 123 proceeds to step S507.

In step S502, the microcomputer 123 performs multiple exposure shooting processing. The multiple exposure shooting processing will be described in detail below with reference to FIG. 6.

In step S503, the microcomputer 123 refers to the system memory 132 and determines whether the number of images captured for multiple exposure shooting is "1". In other words, the microcomputer 123 determines whether the first image for a set of multiple exposure shots is captured by the multiple exposure shooting processing performed in step S502. If the number of images captured for multiple exposure shooting is "1" (YES in step S503), the microcomputer 123 proceeds to step S504. In step S504, the microcomputer 123 sets a multiple exposure shooting in-process flag of "1" in the system memory 132. If in step S503 the number of images captured for multiple exposure shooting is determined to be not "1" (NO in step S503) or after the multiple exposure shooting in-process flag is set to "1" in step S504, the microcomputer 123 proceeds to step S505.

In step S505, the microcomputer 123 determines whether the number of images captured for multiple exposure shooting retained in the system memory 132 is equal to the number of images predetermined for multiple exposure shooting. If the two numbers are equal (YES in step S505), a set of multiple exposure shots has been completed. In step S506, the microcomputer 123 performs save and exit processing, and then ends the multiple exposure shooting mode processing. The save and exit processing will be described below with reference to FIG. 12.

In step S507, the microcomputer 123 determines whether the playback button 18 is pressed (whether there is an instruction to enter a playback mode). If the playback button 18 is pressed (YES in step S507), the microcomputer 123 proceeds to step S508. If the playback button 18 is not pressed (NO in step S507), the microcomputer 123 proceeds to step S514.

In step S508, the microcomputer 123 refers to the system memory 132 and determines whether the multiple exposure shooting in-process flag is "1" (whether in the multiple exposure shooting in-process state). If the multiple exposure shooting in-process flag is "1" (YES in step S508), the microcomputer 123 proceeds to step S510. If the multiple exposure shooting in-process flag is not "1" (NO in step S508), the microcomputer 123 proceeds to step S509.

In step S509, the microcomputer 123 performs normal playback mode processing. In the normal playback mode processing, the microcomputer 123 performs playback processing including a single image display, a multiple display, image advancing, delete, and attaching an attribute. The playback mode processing is targeted for all images that are recorded on the recording medium 120 and reproducible by the digital camera 100.

In step S510, the microcomputer 123 determines whether a base image is set. If no base image is set (NO in step S510), the microcomputer 123 proceeds to step S511. If a base image is set (YES in step S510), the microcomputer 123 proceeds to step S513.

In step S511, the microcomputer 123 determines whether the number of images captured for multiple exposure shooting recorded in the system memory 132 is greater than or equal to "2". If the number is determined to be greater than or equal to "2" (YES in step S511), the microcomputer 123 proceeds to step S513. If the number is less than "2" (NO in step S511), the microcomputer 123 proceeds to step S512. Since the multiple exposure shooting in-process flag is "1", that the number of images captured for multiple exposure shooting is less than "2" means that the number of images captured for multiple exposure shooting is "1".

In step S512, the microcomputer 123 performs multiple first image QR and playback processing. The multiple first image QR and playback processing is display processing intended to check an image that has been acquired after entry to a multiple exposure shooting mode, and to check how the image is multiple combined. None of the images captured before the entry to the multiple exposure shooting mode is displayed, except a base image. The multiple first image QR and playback processing will be described below with reference to FIG. 9.

In step S513, the microcomputer 123 performs multiple QR and playback processing. The multiple QR and playback processing is display processing to check images that have been acquired after entry to the multiple exposure shooting mode, and to check how the images are multiple combined. None of images captured before the entry to the multiple exposure shooting mode is displayed, except a base image. The multiple QR and playback processing will be described below with reference to FIG. 8.

In step S514, the microcomputer 123 refers to the system memory 132 and determines whether the multiple exposure shooting in-process flag is "1". If the multiple exposure shooting in-process flag is "1" (YES in step S514), the microcomputer 123 proceeds to step S515. If the multiple exposure shooting in-process flag is not "1" (NO in step S514), the microcomputer 123 proceeds to step S517.

In step S515, the microcomputer 123 determines whether an interruptive event has occurred. The interruptive event refers to an event on which the multiple exposure shooting mode is to be interrupted. Examples include the following:

An event that changes the multiple exposure shooting necessity setting to "off" according to a user operation.

A user operation on the main switch 20, opening of the card lid, and opening of the battery lid. An event that turns off the power, such as expiration of an automatic power-off time.

An event that prevents continuation of multiple exposure shooting depending on conditions of shooting settings. If an interruptive event has occurred (YES in step S515), the microcomputer 123 proceeds to step S516. If no such event has occurred (NO in step S515), the microcomputer 123 proceeds to step S517.

In step S516, the microcomputer 123 performs the save and exit processing. The save and exit processing will be described below with reference to FIG. 12.

In step S517, the microcomputer 123 refers to the multiple exposure shooting necessity setting stored in the system memory 132 or the nonvolatile memory 130, and determines whether the multiple exposure shooting is set at "on." If the multiple exposure shooting is set at "on" (YES in step S517), the microcomputer 123 proceeds to step S501 to repeat the multiple exposure shooting mode processing. If the multiple exposure shooting is set at "off" (NO in step S517), the microcomputer 123 ends the multiple exposure shooting mode processing.

Figure 6:
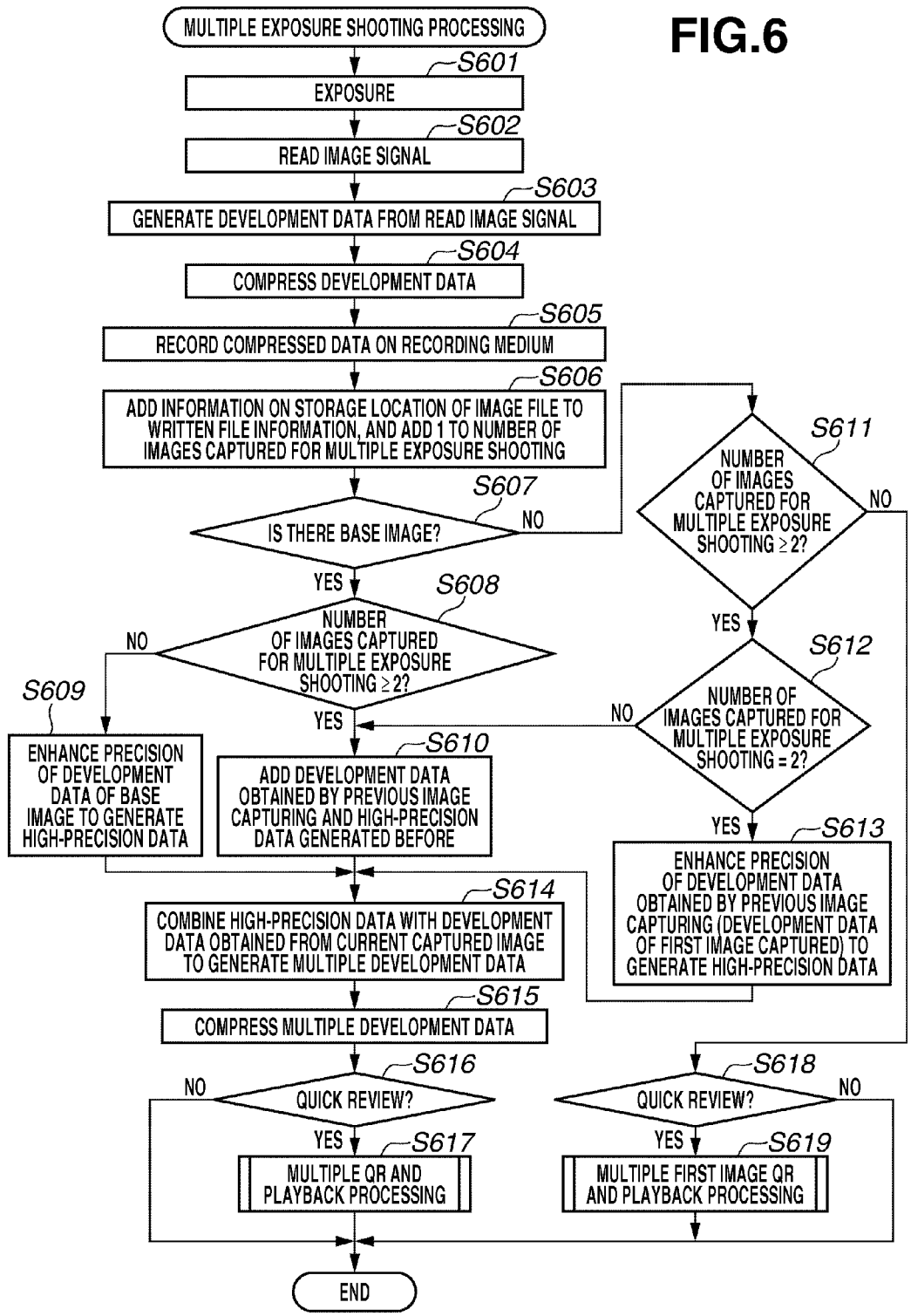
FIG. 6 is a flowchart illustrating multiple exposure shooting processing.

FIG. 6 is a flowchart illustrating the multiple exposure shooting processing in step S502 illustrated in FIG. 5 described above. The processing illustrated in FIG. 6 is implemented by a program recorded in the nonvolatile memory 130 being loaded into the system memory 132 and executed by the microcomputer 123.

In step S601, the microcomputer 123 controls exposure. When the exposure is completed, then in step S602, the microcomputer 123 performs control to read an image signal accumulated in the image sensor 112.

In step S603, the microcomputer 123 instructs the image signal generation circuit 116 to generate development data from the image signal read in step S602. As illustrated in FIGS. 4A to 4E, the generated development data is stored in the buffer memory 122.

In step S604, the microcomputer 123 causes the image signal processing circuit 116 to compress the development data generated in step S603. In step S605, the microcomputer 123 records the result on the recording medium 120 as an image file (first recording control). The image file contains a single original image, not a combined one. In step S606, the microcomputer 123 adds information indicating the storage location of the image file recorded in step S605 to written file information retained in the system memory 132. Instead of or in addition to the information indicating the storage location of the image file, the microcomputer 123 may record information that identifies the image file (such as a file name). The microcomputer 123 adds "1" to the number of images captured for multiple exposure shooting retained in the system memory 132.

In step S607, the microcomputer 123 determines whether a base image is set. If there is a base image (YES in step S607), the microcomputer 123 proceeds to step S608. If no base image is set (NO in step S607), the microcomputer 123 proceeds to step S611.

In step S608, the microcomputer 123 refers to the system memory 132 and determines whether the number of images captured for multiple exposure shooting is greater than or equal to "2". If the number is less than "2", i.e., the number of captured images is only one which results from the current image capturing (NO in step S608), the microcomputer 123 proceeds to step S609. If the number is greater than or equal to "2" (YES in step S608), the microcomputer 123 proceeds to step S610.

In step S609, the microcomputer 123 reads the base image from the recording medium 120 and acquires development data of the base image. The microcomputer 123 enhances the precision of the development data of the base image by using the image signal processing circuit 116, and stores the resulting high-precision data into the buffer memory 122. In other words, the processing is performed with the base image as an image signal A obtained by the capturing of the first image in FIG. 4B and with the image data acquired by the current image capturing in step S602 as an image signal B obtained by the capturing of the second image in FIG. 4B.

In step S610, the microcomputer 123 enhances the precision of the development data obtained by the previous image capturing by using the image signal processing circuit 116. The microcomputer 123 adds the result to high-precision data generated before to generate high-precision data, and stores the high-precision data into the buffer memory 122. In terms of the example illustrated in FIGS. 4A to 4E, such an operation translates as follows: When the third image is captured in FIG. 4C, development data B obtained by the capturing of the second image is enhanced in precision. The result is added to high-precision data A that is generated when the second image is captured, whereby high-precision data A+B is generated. The high-precision data A+B is stored into the buffer memory 122.

In step S611, the microcomputer 123 refers to the system memory 132 and determines whether the number of images captured for multiple exposure shooting is greater than or equal to "2". If the number is determined to be greater than or equal to "2" (YES in step S611), the microcomputer 123 proceeds to step S612. If the number is less than "2", i.e., the number of captured images is only one, which results from the current image capturing (NO in step S611), the microcomputer 123 proceeds to step S618. If in step S611 the number of images captured for multiple exposure shooting is determined to be only one, which results from the current image shooting (NO in step S611), the buffer memory 122 is in the state illustrated in FIG. 4A.

In step S612, the microcomputer 123 determines whether the number of images captured for multiple exposure shooting is "2". If the number is not "2", i.e., is three or greater (NO in step S612), the microcomputer 123 proceeds to step S610. If the number is "2" (YES in step S612), the microcomputer 123 proceeds to step S613.

In step S613, the microcomputer 123 enhances the precision of the development data obtained by the previous image capturing by using the image signal processing circuit 116, thereby generating high-precision data. The microcomputer 123 stores the high-precision data into the buffer memory 122. In terms of the example illustrated in FIGS. 4A to 4E, such an operation translates as follows. Development data A obtained by the capturing of the first image is enhanced in precision when the second image is captured in FIG. 4B. The result is stored into the buffer memory 122 as high-precision data A.

In step S614, the microcomputer 123 multiple combines high-precision data generated in any one of steps S609, S610, and S613 with the development data of the current captured image, generated in step S603, by using the image signal processing circuit 116. The microcomputer 123 stores the generated multiple combined image into the buffer memory 122 as multiple development data.

In step S615, the microcomputer 123 reduces and compresses the high-precision data generated in step S614 by using the image signal processing circuit 116. The microcomputer 123 stores the result into the buffer memory 122 as display-specific multiple data.

In step S616, the microcomputer 123 determines whether a quick review (QR) is set to be made. Whether to make a QR immediately after image capturing may be set in advance according to a user operation. If a QR is set to be made (YES in step S616), the microcomputer 123 proceeds to step S617. In step S617, the microcomputer 123 performs the multiple QR and playback processing. The multiple QR and playback processing will be described below with reference to FIG. 8. If in step S616 a QR is set not to be made (NO in step S616) or after the processing in step S617 is completed, the microcomputer 123 ends the multiple exposure shooting processing. The microcomputer 123 then proceeds to step S503 illustrated in FIG. 5 described above.

In step S618, the microcomputer 123 determines whether a quick review (QR) is set to be made. If a QR is set to be made (YES in step S618), the microcomputer 123 proceeds to step S619. In step S619, the microcomputer 123 performs the multiple first image QR and playback processing. The multiple first image QR and playback processing will be described below with reference to FIG. 9. If in step S618 a QR is set not to be made (NO in step S618) or after the processing in step S619 is completed, the microcomputer 123 ends the multiple exposure shooting processing. The microcomputer 123 then proceeds to step S503 illustrated in FIG. 5 described above.

Figure 7A:
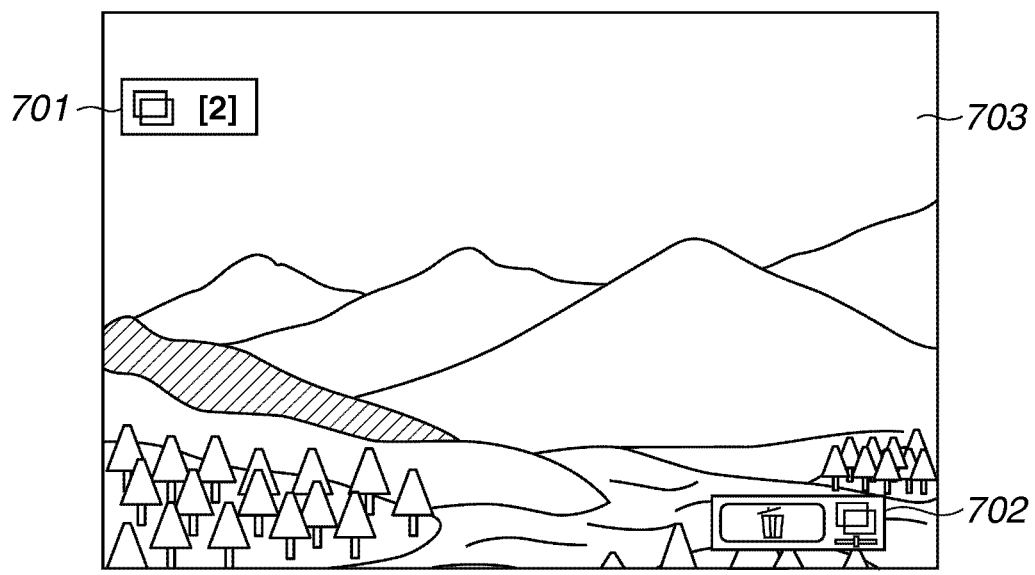
FIGS. 7A and 7B are diagrams illustrating display examples of a quick review in multiple exposure shooting.
Figure 7B:
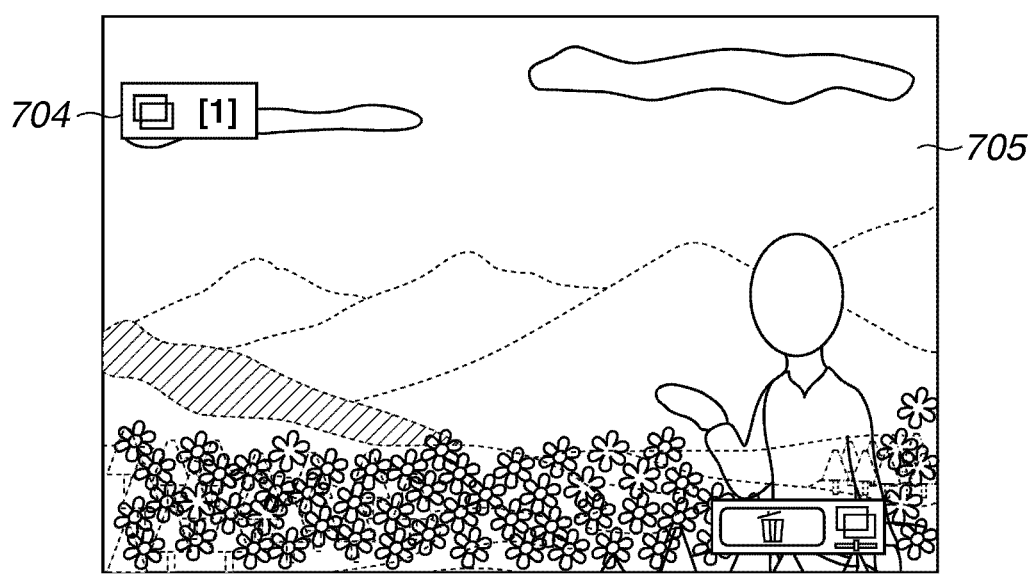

FIGS. 7A and 7B illustrate display examples of an initial display screen to be displayed on the display member 118 for a quick review in multiple exposure shooting (display control). FIGS. 7A and 7B each illustrate a display example where the number of images to be superimposed for multiple exposure shooting is set at "3" via the menu item 302 illustrated in FIG. 3 described above, and no base image is set via the menu item 304.

FIG. 7A illustrates an initial display screen that is displayed for a quick review immediately after the capturing of the first image for a set of multiple exposure shots. Such a screen is initially displayed in the multiple first image QR and playback processing illustrated in FIG. 9 to be described below. A display item 701 includes an icon that indicates that the image is the one obtained by multiple exposure shooting. The display item 701 also includes an indication that there are two images left to reach the number of images predetermined for multiple exposure shooting. A display item 702 is a guide display indicating that the delete button 19 can be pressed to display a processing select dialog to be described below. An image 703 is the one that is not multiple combined because only one image has been captured. The image 703 is based on an image file read from the recording medium 120.

Figure 8:
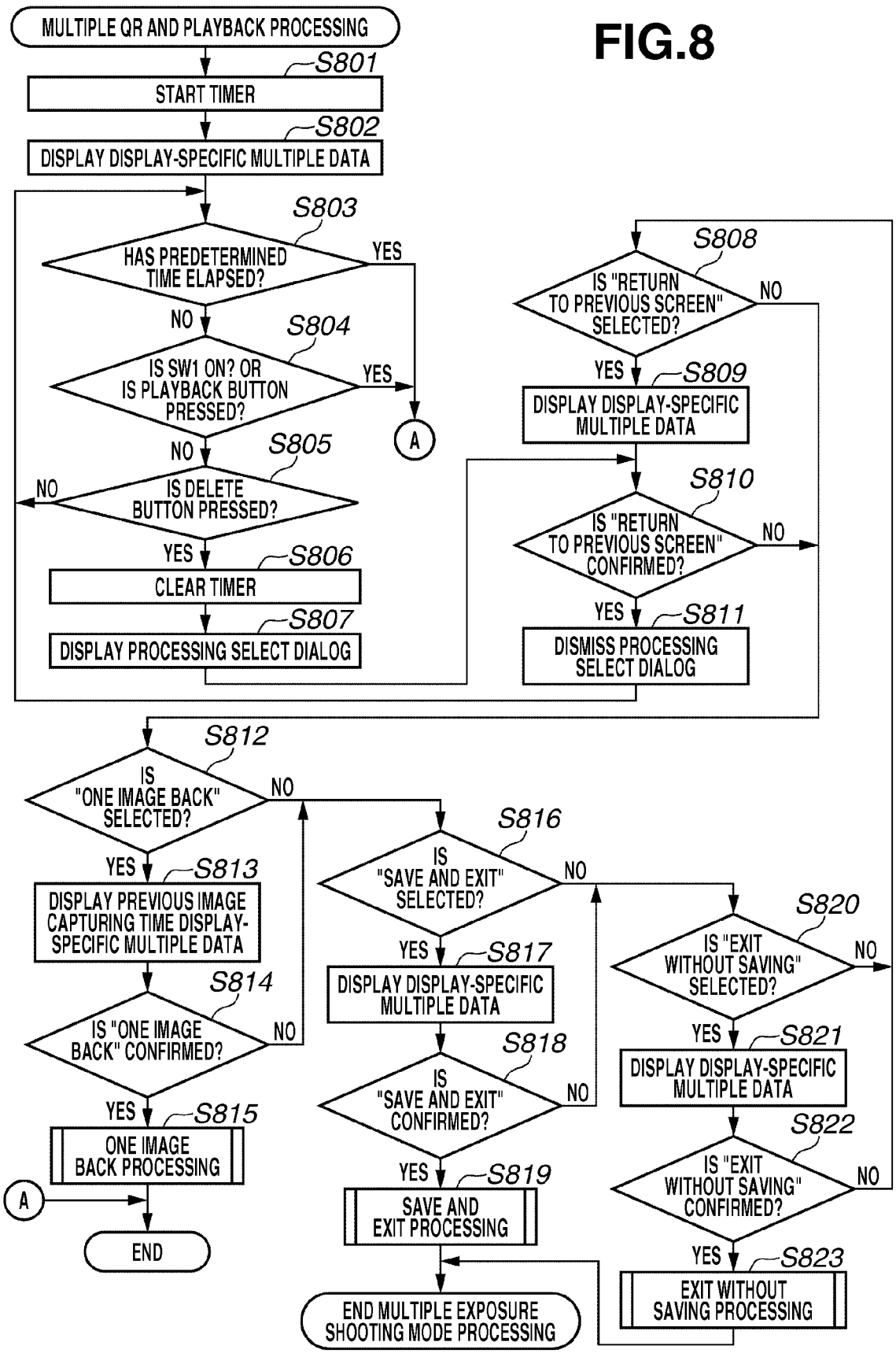
FIG. 8 is a flowchart illustrating multiple quick review and playback processing.

FIG. 7B illustrates an initial display screen that is displayed for a quick review immediately after the capturing of the second image for a set of multiple exposure shots. Such a screen is initially displayed in the multiple QR and playback processing illustrated in FIG. 8 to be described below. A display item 704 expresses a meaning similar to that of the display item 701 in FIG. 7A. The display item 704 indicates that there is one image left, one fewer, to reach the number of images predetermined for multiple exposure shooting. An image 705 is a multiple combined image of the first image and the currently-captured, second, image. The image 705 displays the display-specific multiple data A+B in FIG. 4B FIG. 8 is a flowchart illustrating the multiple QR and playback processing in step S513 illustrated in FIG. 5 and step S617 illustrated in FIG. 6 described above. The processing illustrated in FIG. 8 is implemented by a program recorded in the nonvolatile memory 130 being loaded into the system memory 132 and executed by the microcomputer 123.

In step S801, the microcomputer 123 starts counting (starts a timer) the time of a quick review (for example, two seconds). Such processing is not performed if a quick review time is set at HOLD (no automatic cancellation) or if the playback button 18 has been pressed to enter the processing illustrated in FIG. 8 (i.e., when in the playback mode processing).

In step S802, the microcomputer 123 displays display-specific multiple data illustrated in FIGS. 4A to 4E on the display member 118. A display example is illustrated in FIG. 7B described above. The user can view the display-specific multiple data to check a multiple combined image that is to be generated from images obtained by image capturing so far. More specifically, the user can check a multiple combined image (first image) made of a number (first number) of images including an image or images as many as the number of images captured for multiple exposure shooting at this point in time and a base image if any.

In step S803, the microcomputer 123 determines whether a predetermined quick view time has elapsed from the clocking of step S801. If the predetermined time has elapsed (YES in step S803), the microcomputer 123 ends the multiple QR and playback processing and returns to the multiple exposure shooting mode processing illustrated in FIG. 5. If the predetermined time has not elapsed yet (NO in step S803), the microcomputer 123 proceeds to step S804. The processing in step S803 is not performed if the quick review time is set to HOLD (no automatic cancellation) or if the playback button 18 has been pressed to enter the processing illustrated in FIG. 8 (i.e., when in the playback mode processing).

In step S804, the microcomputer 123 determines whether the SW1 is ON and whether the playback button 18 is pressed. If the SW1 is determined to be ON or the playback button 18 is determined to be pressed (YES in step S804), the microcomputer 123 ends the multiple QR and playback processing and returns to the multiple exposure shooting mode processing illustrated in FIG. 5. If not (NO in step S804), the microcomputer 123 proceeds to step S805.

In step S805, the microcomputer 123 determines whether the delete button 19 is pressed. If the delete button 19 is determined to be pressed (YES in step S805), the microcomputer 123 proceeds to step S806. If the delete button 19 is determined to be not pressed (NO in step S805), the microcomputer 123 returns to step S803 and repeats the foregoing processing.

In step S806, the microcomputer 123 ends counting time and clears the timer if the quick review time has started being counted in step S801.

Figure 10A:
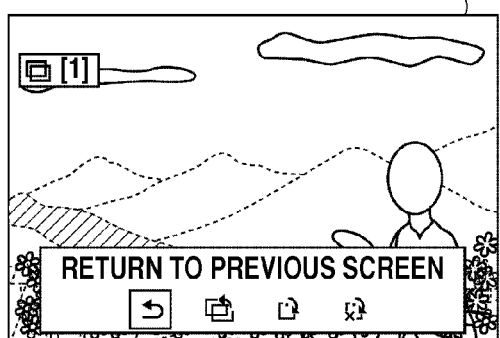
FIGS. 10A, 10B, 10C, 10D, 10E, 10F, 10G, and 10H are diagrams illustrating display examples where a processing select dialog is displayed during a quick review in multiple exposure shooting.

In step S807, the microcomputer 123 displays a processing select dialog on the display member 118. FIG. 10A illustrates a display example of the processing select dialog. A processing select dialog 1005 is displayed as superimposed on a display of display-specific multiple data 705. A return to previous screen icon 1001, a one image back icon 1002, a save and exit icon 1003, and an exit without saving icon 1004 are displayed in a lower part of the processing select dialog 1005. A description text on one of the icons 1001 to 1004 that is currently selected by a select frame is displayed in an upper part of the processing select dialog 1005. The select frame can be moved to an arbitrary icon according to an operation on the sub electronic dial 22. For an initial state, in step S807, the microcomputer 123 displays the processing select dialog 1005 with the return to previous screen icon 1001 selected by the select frame. Having displayed the processing select dialog 1005, the microcomputer 123 proceeds to step S810.

In step S810, the microcomputer 123 determines whether the set button 21 is pressed to make a confirmation operation with the return to previous screen icon 1001 selected. If a confirmation operation is determined to be made with the return to previous screen icon 1001 selected (YES in step S810), then in step S811, the microcomputer 123 dismisses the processing select dialog to restore the display illustrated in FIG. 7B. The microcomputer 123 then returns to step S803 to repeat the processing. If no such confirmation operation is determined to be made (NO in step S810), the microcomputer 123 proceeds to step S812.

Figure 10B:
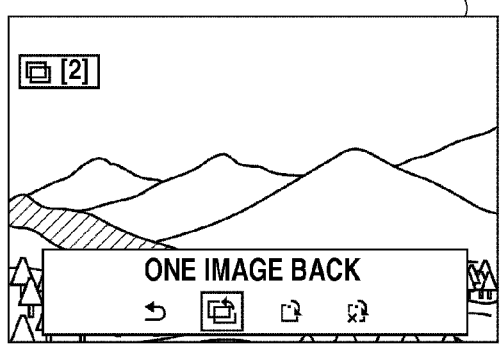

In step S812, the microcomputer 123 determines whether the one image back icon 1002 is selected by the select frame. If the one image back icon 1002 is selected (YES in step S812), the microcomputer 123 proceeds to step S813. If not (NO in step S812), the microcomputer 123 proceeds to step S816. In step S813, the microcomputer 123 displays previous image capturing time display-specific multiple data stored in the buffer memory 122, illustrated in FIGS. 4A to 4E, on the display member 118. A display example is illustrated in FIG. 10B. An image 706 represents previous image capturing time display-specific multiple data. In the example illustrated in FIG. 10B, two images have been captured for a set of multiple exposure shots when the display is moved one image back. The image 706 thus shows a non-multiple image including only the first image. If three or more images have been captured when a display is moved one image back, then the user can check a multiple combined image excluding the image captured immediately before (last captured image). More specifically, the user can check a multiple combined image (second image) made of a number (second number) of images including images as many as the number of images captured for multiple exposure shooting at this point in time and a base image if any (first number), excluding the last captured image. In such a way, according to an exemplary embodiment of the present invention, a multiple combined image (image 706) excluding the last captured image and a multiple combined image (image 705) including the last captured image can be switched for display during a quick review or in a playback mode. Such a switched display allows the user to easily compare the two images and determine whether the immediately previous image is a satisfactory one as an image to be multiple combined. If the immediately previous image is not satisfactory, the user can discard the immediately previous image and continue multiple exposure processing from one image back.

In step S814, the microcomputer 123 determines whether the set button 21 is pressed to make a confirmation operation with the one image back icon 1002 selected (in other words, whether a recapturing instruction is given). If a confirmation operation is determined to be made with the one image back icon 1002 selected (YES in step S814), the microcomputer 123 proceeds to step S815. If not (NO in step S814), the microcomputer 123 proceeds to step S816.

In step S815, the microcomputer 123 performs one image back processing. The one image back processing will be described below with reference to FIG. 11. Completing the one image back processing, the microcomputer 123 ends the multiple QR and playback processing and returns to the multiple exposure shooting mode processing illustrated in FIG. 5.

Figure 10C:
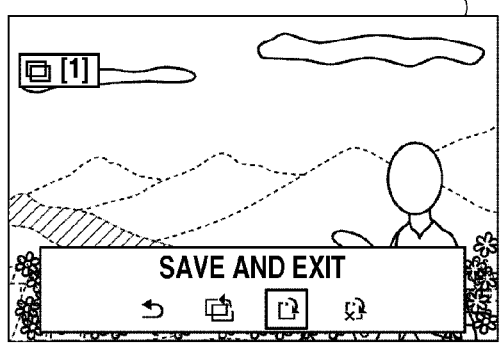

In step S816, the microcomputer 123 determines whether the save and exit icon 1003 is selected by the select frame. If the save and exit icon 1003 is selected (YES in step S816), the microcomputer 123 proceeds to step S817. If not (NO in step S816), the microcomputer 123 proceeds to step S820. In step S817, the microcomputer 123 displays display-specific multiple data stored in the buffer memory 122, illustrated in FIGS. 4A to 4E, on the display member 118. A display example is illustrated in FIG. 10C. The image 705 displays the display-specific multiple data. The user views the image 705. If the multiple combined image generated from the images obtained by multiple exposure shooting so far is satisfactory, the microcomputer 123 may generate and save a multiple combined image and end the multiple exposure shooting.

In step S818, the microcomputer 123 determines whether the set button 21 is pressed to make a confirmation operation with the save and exit icon 1003 selected. If a confirmation operation is determined to be made with the save and exit icon 1003 selected (YES in step S818), the microcomputer 123 proceeds to step S819. If not (NO in step S818), the microcomputer 123 proceeds to step S820.

In step S819, the microcomputer 123 performs the save and exit processing. The save and exit processing will be described below with reference to FIG. 12. Completing the save and exit processing, the microcomputer 123 ends the multiple QR and playback processing. The microcomputer 123 ends the processing in the multiple exposure shooting mode without returning to the multiple exposure shooting mode processing illustrated in FIG. 5, and enters a normal shooting mode.

Figure 10D:
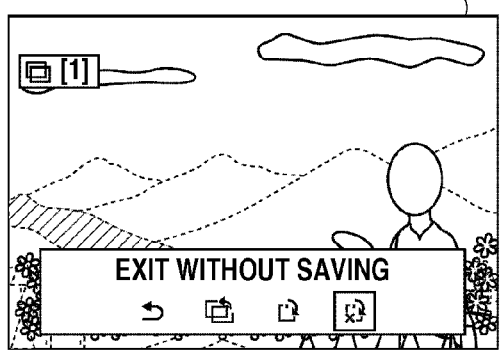

In step S820, the microcomputer 123 determines whether the exit without saving icon 1004 is selected by the select frame. If the exit without saving icon 1004 is selected (YES in step S820), the microcomputer 123 proceeds to step S821. If not (NO in step S820), the microcomputer 123 proceeds to step S808. In step S821, the microcomputer 123 displays display-specific multiple data stored in the buffer memory 122, illustrated in FIGS. 4A to 4E, on the display member 118. A display example is illustrated in FIG. 10D. The image 705 displays display-specific multiple data. The user views the image 705. If the multiple combined image generated from images obtained by multiple exposure shooting so far is not satisfactory on the whole, the user may discard all the images captured so far for the set of multiple exposure shots and end the multiple exposure shooting.

In step S822, the microcomputer 123 determines whether the set button 21 is pressed to make a confirmation operation with the exit without saving icon 1004 selected. If a confirmation operation is determined to be made with the exit without saving icon 1004 selected (YES in step S822), the microcomputer 123 proceeds to step S823. If not (NO in step 5822), the microcomputer 123 proceeds to step S808.

In step S823, the microcomputer 123 performs exit without saving processing. The exit without saving processing will be described below with reference to FIG. 13. Completing the exit without saving processing, the microcomputer 123 ends the multiple QR and playback processing. The microcomputer 123 ends the processing in the multiple exposure shooting mode without returning to the multiple exposure shooting mode processing illustrated in FIG. 5, and enters the normal shooting mode.

In step S808, the microcomputer 123 determines whether the return to previous screen icon 1001 is selected by the select frame. If the return to previous screen icon 1001 is selected (YES in step S808), the microcomputer 123 proceeds to step S809. If not (NO in step S808), the microcomputer 123 proceeds to step S812. In step S809, the microcomputer 123 displays display-specific multiple data stored in the buffer memory 122, illustrated in FIGS. 4A to 4E, on the display member 118. A display example is illustrated in FIG. 10A described above.

Note that in the initial display in step S802 illustrated in FIG. 8, the display member 118 displays display-specific multiple data. Instead, the display member 118 may display a non-multiple captured image that is captured immediately before. Processing of selecting and switching to display display-specific multiple data and a non-multiple captured image may be added.

Figure 9:
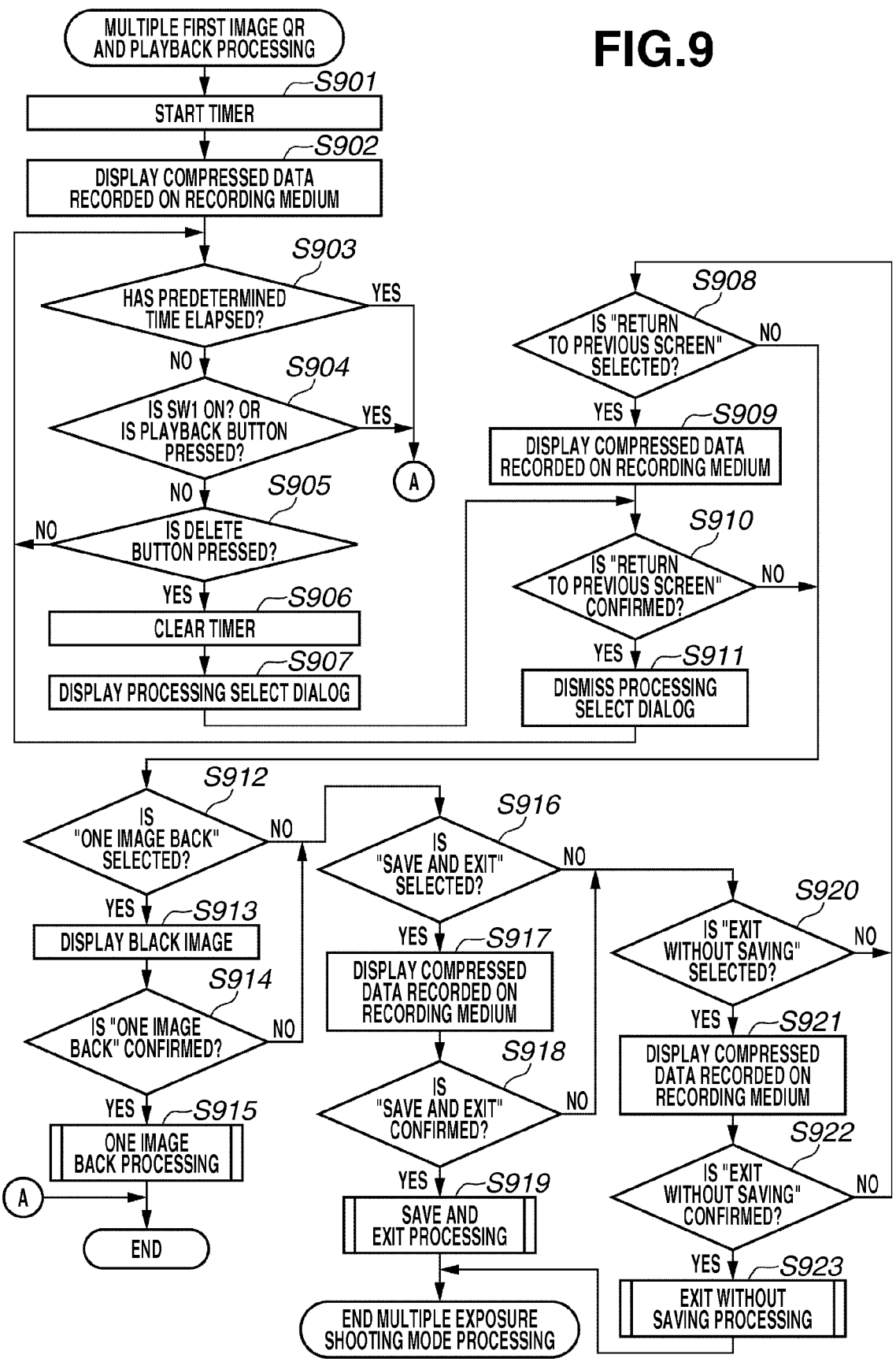
FIG. 9 is a flowchart illustrating multiple first image quick review and playback processing.

FIG. 9 is a flowchart illustrating the multiple first image QR and playback processing in step S512 illustrated in FIG. 5 and step S619 illustrated in FIG. 6 described above. The processing illustrated in FIG. 9 is implemented by a program recorded in the nonvolatile memory 130 being loaded into the system memory 132 and executed by the microcomputer 123.

Step S901 is similar to step S801 illustrated in FIG. 8 described above. Description thereof will thus be omitted.

In step S902, the microcomputer 123 decodes compressed data on the image file of an image that is captured immediately before, recorded on the recording medium 120, and displays the result on the display member 118. A display example is illustrated in FIG. 7A described above. The multiple first image QR and playback processing illustrated in FIG. 9 deals with a situation where there is no base image and only one image has been captured by multiple exposure shooting. The buffer memory 122 thus stores no display-specific multiple data. The microcomputer 123 then displays the image 703 based on an image file read from the recording medium 120.

Figure 10E:
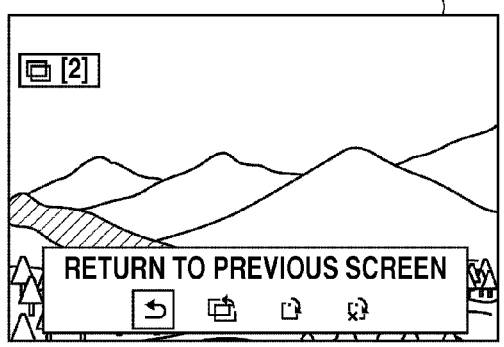

The processing in steps S903 to S907 and S910 to S912 is similar to the processing in steps S803 to S807 and S810 to S812 illustrated in FIG. 8 described above, respectively. Description thereof will thus be omitted. FIG. 10E illustrates a display example in step S907.

Figure 10F:
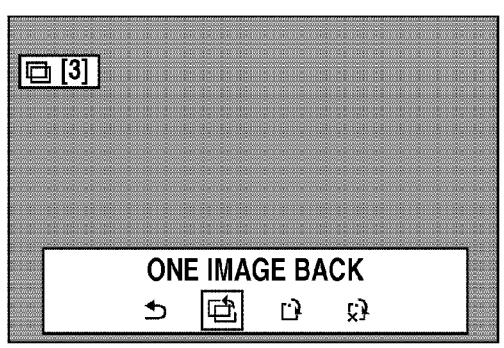

In step S913, the microcomputer 123 causes the display member 118 to display a black image since the buffer memory 122 stores no previous image capturing time display-specific multiple data. A display example is illustrated in FIG. 10F. Such a display can inform the user that, after one image back, there is no image obtained by multiple exposure shooting. Other displays may be used instead of a black image. A warning such as "No image to display" may be displayed. An alternative image to the black image may be a monotone image in order to indicate that the image is not a captured one.

The processing in steps S914 to S916 is similar to the processing in steps S814 to S816 illustrated in FIG. 8 described above, respectively. Description thereof will thus be omitted.

Figure 10G:
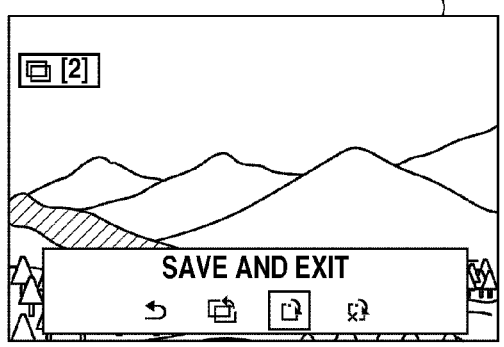

In step S917, the buffer memory 122 stores no display-specific multiple data. The microcomputer 123 then decodes compressed data on an image file of an image that is captured immediately before, recorded on the recording medium 120, and displays the result on the display member 118. A display example is illustrated in FIG. 10G.

The processing in steps S918 to S920 is similar to the processing in steps S818 to S820 illustrated in FIG. 8 described above, respectively. Description thereof will thus be omitted.

Figure 10H:
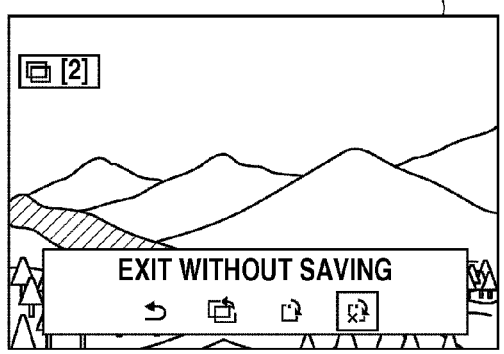

In step S921, the buffer memory 122 stores no display-specific multiple data. The microcomputer 123 then decodes compressed data on an image file of an image that is captured immediately before, recorded on the recording medium 120, and displays the result on the display member 118. A display example is illustrated in FIG. 10H.

The processing in steps S922, S923, and S908 is similar to the processing in steps S822, S823, and S808 illustrated in FIG. 8 described above, respectively. Description thereof will thus be omitted.

In step S921, the buffer memory 122 stores no display-specific multiple data. The microcomputer 123 then decodes compressed data on an image file of an image that is captured immediately before, recorded on the recording medium 120, and displays the result on the display member 118.

Figure 11:
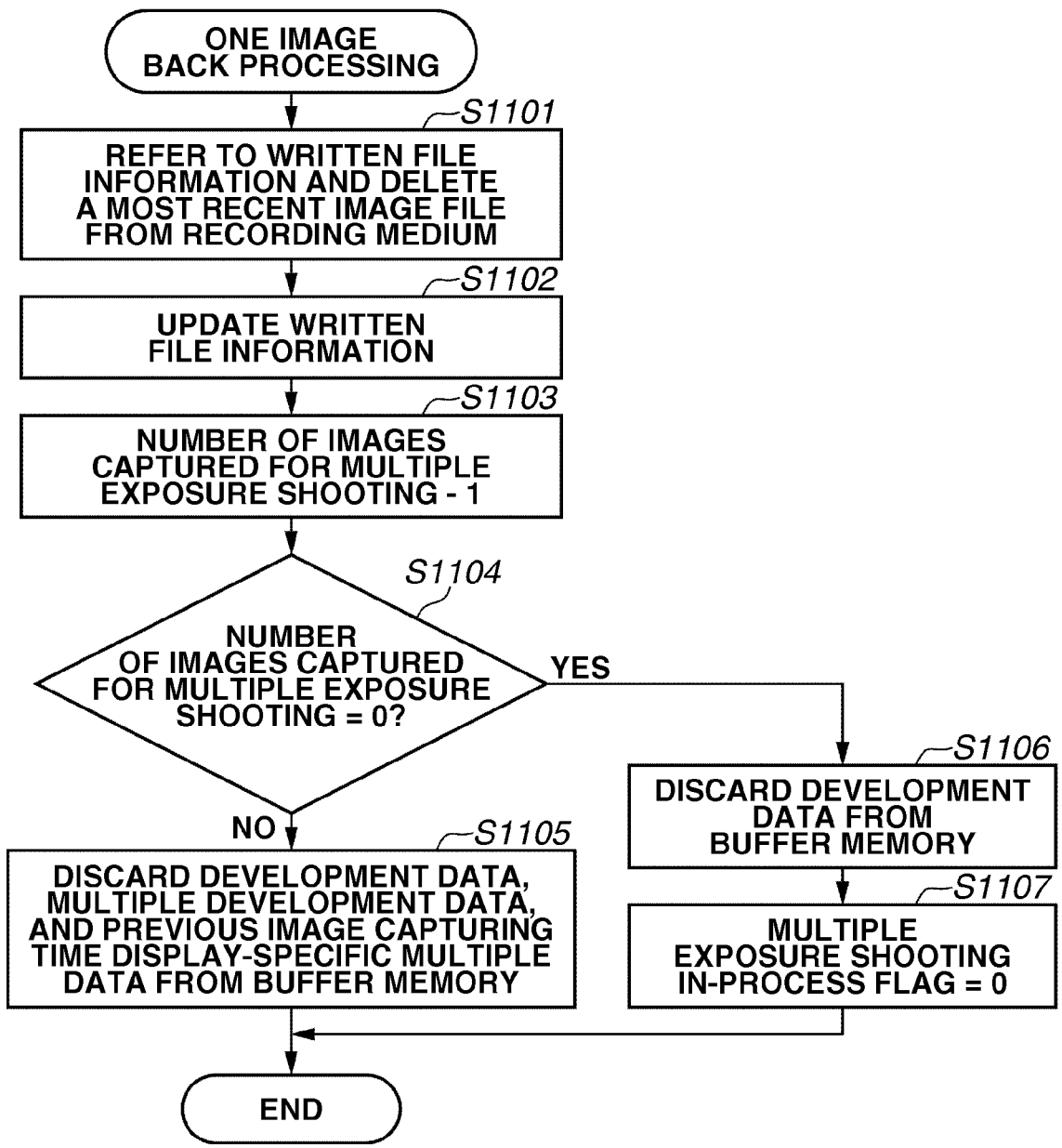
FIG. 11 is a flowchart illustrating one image back processing.

FIG. 11 is a flowchart illustrating the one image back processing in step S815 illustrated in FIG. 8 and step S915 illustrated in FIG. 9 described above. The processing illustrated in FIG. 11 is implemented by a program recorded in the nonvolatile memory 130 being loaded into the system memory 132 and executed by the microcomputer 123.

In step S1101, the microcomputer 123 refers to written file information stored in the system memory 132. The microcomputer 123 searches for an image file of an image captured immediately before, recorded on the recording medium 120, and deletes the image file.

In step S1102, the microcomputer 123 deletes information on the image file deleted in step S1101 from the written file information stored in the system memory 132, thereby updating the written file information.

In step S1103, the microcomputer 123 subtracts "1" from the number of images captured for multiple exposure shooting retained in the system memory 132.

In step S1104, the microcomputer 123 determines whether the number of images captured for multiple exposure shooting retained in the system memory 132 is "0". If the number is determined to be not "0" (NO in step S1104), the microcomputer 123 proceeds to step S1105. If the number is determined to be "0" (YES in step S1104), the microcomputer 123 proceeds to step S1106.

In step S1105, the microcomputer 123 discards development data, multiple development data, and previous image capturing time display-specific multiple data from the buffer memory 122, and ends the one image back processing. Such an operation corresponds to changing the state of the buffer memory 122 from the state illustrated in FIG. 4C to that illustrated in FIG. 4D described above. In the state illustrated in FIG. 4D, high-precision data A+B remains in the buffer memory 122. A third image can thus be recaptured to continue multiple exposure shooting from the previous result of multiple exposure shooting. Display-specific multiple data A+B also remains in the buffer memory 122. After the recapturing of the third image, the display-specific multiple data A+B is retained as previous image capturing time display-specific multiple data A+B, so that the "one image back" processing can be performed again.

In step S1106, the microcomputer 123 discards development data from the buffer memory 122. Such an operation corresponds to discarding the development data in the state illustrated in FIG. 4A.

In step S1107, the microcomputer 123 resets the multiple exposure shooting in-process flag retained in the system memory 132 to "0", and ends the one image back processing. Although the buffer memory 122 contains no image data, the multiple exposure shooting mode processing itself is not terminated here. Multiple exposure shooting can thus be continued from the first image without performing presetting for multiple exposure shooting again.

Figure 12:
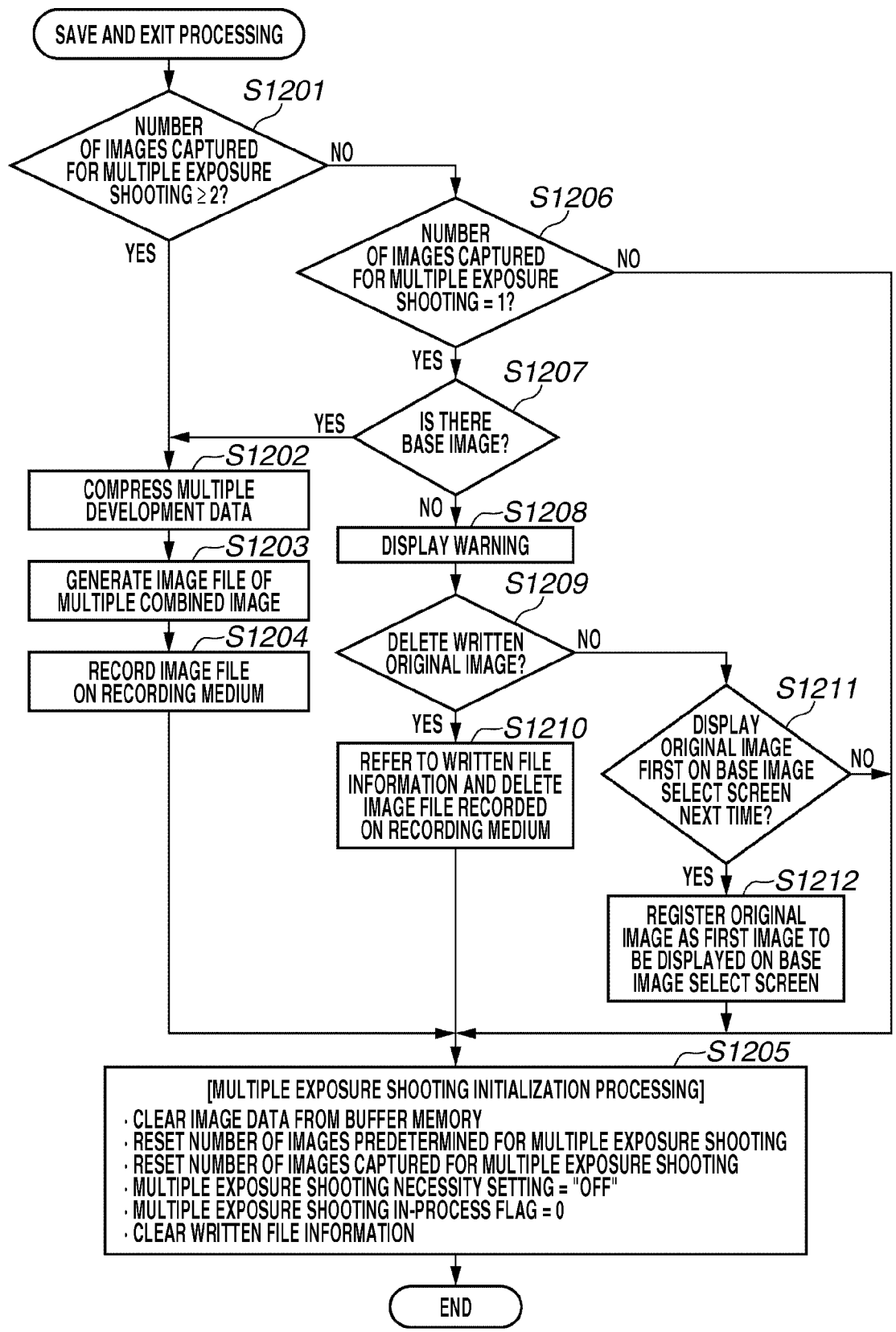
FIG. 12 is a flowchart illustrating save and exit processing.

FIG. 12 is a flowchart illustrating the save and exit processing in step S819 illustrated in FIG. 8 and step S919 illustrated in FIG. 9 described above. The processing illustrated in FIG. 12 is implemented by a program recorded in the nonvolatile memory 130 being loaded into the system memory 132 and executed by the microcomputer 123.

In step S1201, the microcomputer 123 determines whether the number of images captured for multiple exposure shooting retained in the system memory 132 is greater than or equal to "2". If the number is greater than or equal to "2" (YES in step S1201), the microcomputer 123 proceeds to step S1202. If the number is less than "2" (NO in step S1201), the microcomputer 123 proceeds to step S1206.

In step S1202, the microcomputer 123 compresses multiple development data stored in the buffer memory 122 to generate an image file.

In step S1203, the microcomputer 123 generates an image file of a multiple combined image from the multiple development data compressed in step S1202. An example of the generated image file is a JPEG file. The microcomputer 123 may refer to written file information retained in the system memory 132, and record information that identifies the original images of the multiple combined image into a header of the image file of the multiple combined image as attribute information. The microcomputer 123 may store such information into a different area in association with the image file.

In step S1204, the microcomputer 123 records the image file of the multiple combined image generated in step S1203 on the recording medium 120 (second recording control).

In step S1205, the microcomputer 123 performs multiple exposure shooting initialization processing. In the initialization processing, the microcomputer 123 discards all pieces of image data recorded in the buffer memory 122. The microcomputer 123 resets the number of images predetermined for multiple exposure shooting and the number of images captured for multiple exposure shooting recorded in the system memory 132. The microcomputer 123 changes the multiple exposure shooting necessity setting to "off." The microcomputer 123 resets the multiple exposure shooting in-process flag retained in the system memory 132 to "0". The microcomputer 123 deletes all the contents of written file information retained in the system memory 132. Completing the processing in step S1205, the microcomputer 123 ends the save and exit processing.

In step S1206, the microcomputer 123 determines whether the number of images captured for multiple exposure shooting retained in the system memory 132 is "1". If the number is "1" (YES in step S1206), the microcomputer 123 proceeds to step S1207. If the number is not "1", i.e., is "0" (NO in step S1206), the microcomputer 123 proceeds to step S1205.

In step S1207, the microcomputer 123 determines whether a base image is set. If a base image is set (YES in step S1207), the microcomputer 123 proceeds to step S1202. In step S1202, the microcomputer 123 generates an image file of a multiple combined image and records the image file on the recording medium 120. If no base image is set (NO in step S1207), the microcomputer proceeds to step S1208.

In step S1208, only one image has been captured for a set of multiple exposure shots and there is no base image. In such a situation, the generation of a multiple combined image produces substantially no superimposition and results in substantially the same image as the only one image. The microcomputer 123, therefore, displays a warning that no multiple combined image is generated in the absence of superimposition. The microcomputer 123 also displays on the display member 118 a user interface (UI) for accepting a selection whether to delete the written original image file.

In step S1209, the microcomputer 123 determines whether the UI displayed in step S1208 has accepted an instruction from the user via an operation member, the instruction instructing to delete the written original image. If the delete instruction has been received (YES in step S1209), the microcomputer 123 proceeds to step S1210. If no such delete instruction has been received (NO in step S1209), the microcomputer 123 proceeds to step S1211.

In step S1210, the microcomputer 123 refers to written file information retained in the system memory 132, and deletes the image file of the original image that is captured in the multiple exposure shooting mode and recorded on the recording medium 120. The microcomputer 123 also deletes information on the deleted image file from the written file information.

In step S1211, the microcomputer 123 displays a screen for receiving a selection whether to register the written original image as the first image to be displayed on a base image select screen when performing presetting for multiple exposure shooting next time (selection acceptance). The microcomputer 123 then determines whether an instruction to register the written original image as the first image to be displayed on the base image select screen next time is received from the user via an operation member. If the instruction is determined to be received (YES in step S1211), the microcomputer 123 proceeds to step S1212. If the instruction is determined to be not received (NO in step S1211), the microcomputer 123 proceeds to step S1205.

In step S1212, the microcomputer 123 registers the written original image as the first image to be displayed on the base image select screen when performing presetting for multiple exposure shooting next time. As a result, the only image captured in the multiple exposure shooting that is interrupted by the present processing is displayed as the first candidate for a base image when setting a base image from the menu item 304 illustrated in FIG. 3 next time. For example, suppose that multiple exposure shooting is started, an image is captured, and the multiple exposure shooting is once ended for the purpose of image capturing other than the multiple exposure shooting. The processing in step S1212 can reduce the user's operation burden when resuming the multiple exposure shooting at where it ended the last time.

Completing the processing in step S1212, the microcomputer 123 proceeds to step S1205. In step S1205, the microcomputer 123 performs the multiple exposure shooting initialization processing, and ends the save and exit processing.

According to the processing illustrated in FIG. 12, multiple exposure shooting may be ended without a base image and with only one image captured by the multiple exposure shooting, or with a base image and without an image captured by the multiple exposure shooting. In such cases, the microcomputer 123 does not generate or record an image file of a multiple combined image. More specifically, if there is only one image to be multiple combined, the microcomputer 123 does not generate or record an image file of such a multiple combined image. This can prevent substantially the same image files from being redundantly recorded to waste a storage capacity when a multiple combined image generated ends up being substantially the same as its original image. If there is only one image to be multiple combined, the microcomputer 123 may perform up to the generation of a multiple combined image but not the recording of the multiple combined image. This can provide the same effect in terms of preventing the recording capacity from being wasted. The foregoing description has dealt with the case where the written original image is registered in step S1212 as a first image to be displayed on the base image select screen next time. Instead, a base image may simply be set to be used next time and the written original image may be set as the base image next time.

Figure 13:
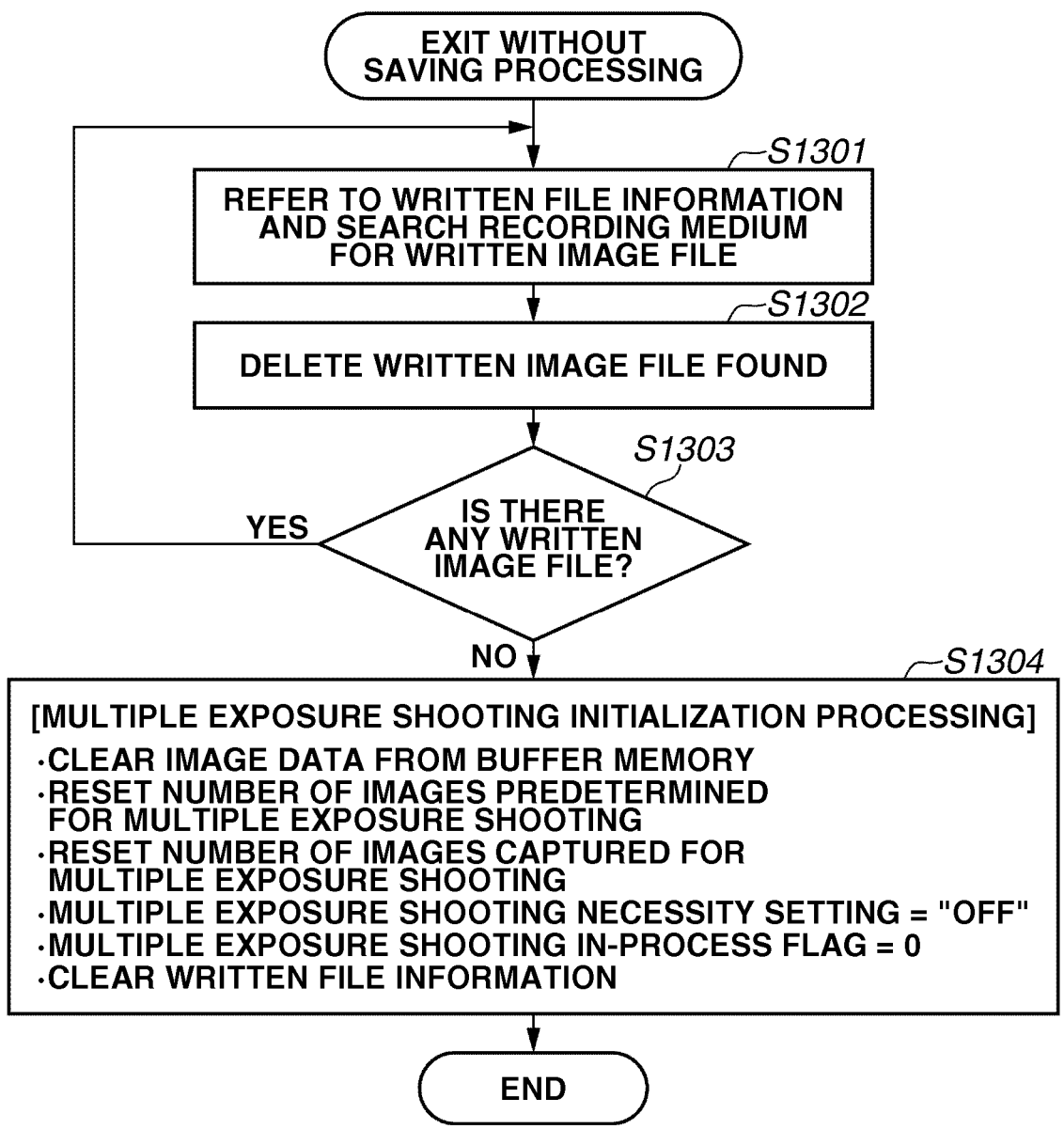
FIG. 13 is a flowchart illustrating exit without saving processing.

FIG. 13 is a flowchart illustrating the exit without saving processing in step S823 illustrated in FIG. 8 and step S923 illustrated in FIG. 9 described above. The processing illustrated in FIG. 13 is implemented by a program recorded in the nonvolatile memory 130 being loaded into the system memory 132 and executed by the microcomputer 123.

In step S1301, the microcomputer 123 refers to written file information retained in the system memory 132, and searches the recording medium 120 for a written image file of an image that is captured for the current set of multiple exposure shots.

In step S1302, the microcomputer 123 deletes the written image file searched for and found in step S1301 from the recording medium 120.

In step S1303, the microcomputer 123 refers to the written file information retained in the system memory 132, and determines whether there is any written image file that is captured for the current set of multiple exposure shots and recorded on the recording medium 120. If it is determined that there is such a file (YES in step S1303), the microcomputer 123 returns to step S1301 and repeats processing to delete the remaining image(s). If it is determined that there is no such file, i.e., all images captured for the current set of multiple exposure shots are determined to have been deleted (NO in step S1303), the microcomputer 123 proceeds to step S1304.

In step S1304, the microcomputer 123 performs multiple exposure shooting initialization processing, and ends the exit without saving processing. The multiple exposure shooting initialization processing is the same processing as that in step S1205 illustrated in FIG. 12.

Instead of the multiple exposure shooting setting menu illustrated in FIG. 3 described in the foregoing exemplary embodiment, more detailed presetting may be performed as to multiple exposure shooting.

Figure 14:
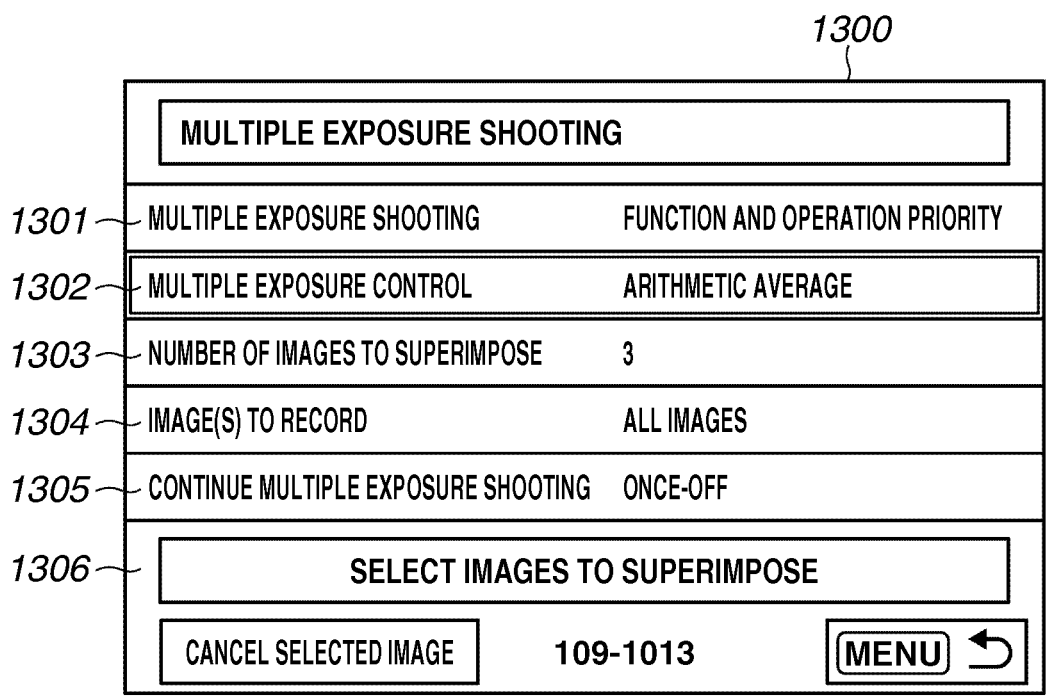
FIG. 14 is a diagram illustrating a display example of another presetting menu screen for multiple exposure shooting.

FIG. 14 illustrates another display example of the menu screen for making settings of the digital camera 100 as to the multiple exposure shooting. FIG. 14 illustrates a menu screen 1300 for multiple exposure shooting. The menu screen 1300 is displayed on the display member 118 when the user presses the menu button 17 to display a general menu and selects a multiple exposure shooting menu from the general menu.

The menu screen 1300 displays menu items 1301 to 1306. The method of selecting a menu item and the method of setting a set value from a list of setting candidates for each menu item are similar to those illustrated in FIGS. 3A and 3B.

The menu item 1301 is a menu item for selecting how multiple exposure shooting is performed. Any one of setting candidates "off," "function and operation priority mode," and "continuous shooting priority mode" can be selected and set. "Off" is the same as "off" illustrated in FIGS. 3A and 3B described above. "Function and operation priority mode" is the same as "on" illustrated in FIGS. 3A and 3B described above. "Continuous shooting priority mode" is a mode intended for faster continuous shooting speed. The continuous shooting priority mode includes saving the usage of the buffer memory 122 and omitting the generation and recording of image files of original images. When the continuous shooting priority mode is selected, the microcomputer 123 does not generate display-specific multiple data after each image capturing. The microcomputer 123 does not store display-specific multiple data or previous image capturing time display-specific multiple data into the buffer memory 122. The microcomputer 123 does not perform the multiple QR and playback processing (FIG. 8) or the multiple first image QR and playback processing (FIG. 9). Nothing happens when the playback button 18 is pressed while the multiple exposure shooting in-process flag is "1". The microcomputer 123 thus does not perform the exit without saving processing (FIG. 13). In such a way, the continuous shooting speed in multiple exposure shooting can be improved.

The menu item 1302 is a menu item for selecting a method of combination when generating a multiple combined image. Any one of setting candidates "add," "arithmetic average," "compare (lighten)," and "compare (darken)" can be selected and set. "Add" is the same as the automatic exposure control function "off" illustrated in FIGS. 3A and 3B described above. "Arithmetic average" is the same as the automatic exposure control function "on" illustrated in FIGS. 3A and 3B described above. "Compare (lighten)" refers to a method in which multiple development data of captured images is compared with an image captured immediately before, and only portions where the image captured immediately before is brighter are extracted for combination. On the other hand, "compare (darken)" refers to a method in which only portions where the image captured immediately before is darker are extracted for combination.

The menu item 1303 is a menu item for selecting the number of images to be superimposed for a set of multiple exposure shots. The menu item 1303 is the same as the menu item 302 illustrated in FIGS. 3A and 3B described above.

The menu item 1304 is a menu item for selecting whether to record an original image or images on the recording medium 120. Either one of setting candidates "all images" and "multiple image only" can be selected and set. "All images" is selected to record the original image (s) as well. "Multiple image only" is selected not to record the original image(s). When "multiple image only" is set, the microcomputer 123 does not record a captured non-multiple image file (original image file) in step S605 illustrated in FIG. 6 described above.

The menu item 1305 is a menu item for selecting whether to continue performing multiple exposure shooting under the same condition as set in FIG. 14 after the number of images captured for multiple exposure shooting reaches the number of images predetermined for multiple exposure shooting and a set of multiple exposure shots is completed. Either one of "once-off" and "repeat" can be set. "Once-off" applies to the procedure illustrated in FIG. 5 described above. When the number of images captured for multiple exposure shooting reaches the number of images predetermined for multiple exposure shooting, the microcomputer 123 performs the save and exit processing (S506) and changes the multiple exposure shooting necessity setting to "off." The microcomputer 123 ends the multiple exposure shooting mode processing and enters another shooting mode. In the case of "repeat," when the number of images captured for multiple exposure shooting reaches the number of images predetermined for multiple exposure shooting and a set of multiple exposure shots is completed (S505) in FIG. 5 described above, the microcomputer 123 does not change the multiple exposure shooting necessity setting to "off" in the save and exit processing (S506). After the processing in step S505, the microcomputer 123 returns to step S501 with the condition set in FIG. 14, and repeats the multiple exposure shooting mode processing from the first image.

The present exemplary embodiment has dealt with the case of using development data for multiple combination. However, undeveloped raw image data may be used for multiple combination.

The control of the microcomputer 123 may be performed by a single piece of hardware. The entire apparatus may be controlled by distributing processing among a plurality of pieces of hardware.

The present invention has been described in detail based on exemplary embodiments thereof. The present invention is not limited to such particular exemplary embodiments, and various aspects are also included in the present invention without departing from the gist of the invention. The foregoing exemplary embodiments are just a few exemplary embodiments of the present invention. The exemplary embodiments may be combined as appropriate.

The foregoing embodiments have dealt with the cases where the present invention is applied to a digital camera. This is not restrictive, and exemplary embodiments of the present invention may be applied to any imaging apparatus that includes an imaging unit. More specifically, exemplary embodiments of the present invention may be applied to a digital camera, a digital video camera, a camera-equipped personal computer, a camera-equipped personal digital assistant (PDA), a camera-equipped cellular phone terminal, a camera-equipped music player, a camera-equipped game machine, and a camera-equipped electronic book reader.

An exemplary embodiment of the present invention may be implemented by executing the following processing. The processing includes supplying software (program) that implements the functions of the foregoing exemplary embodiments to a system or an apparatus via a network or via various types of storage media, and a computer (or a central processing unit (CPU) or micro processing unit (MPU)) of the system or apparatus reading and executing the program code. In such a case, the program and the storage media containing the program constitute exemplary embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-101316 filed Apr. 28, 2011, which is hereby incorporated by reference herein in its entirety.

What is claimed is:

1. An imaging apparatus comprising:
   a first recording control unit configured to perform control to record an uncombined image captured in a multiple exposure shooting mode on a recording medium;
   a generation unit configured to combine an image or images captured in the multiple exposure shooting mode to generate a multiple combined image to be recorded on the recording medium;
   a second recording control unit configured to perform control to record the multiple combined image on the recording medium;
   a control unit configured to, if a number of images to be combined by the generation unit is one when multiple exposure shooting ends, perform control to prevent the generation unit from generating the multiple combined image or to prevent the second recording control unit from recording the multiple combined image; and
   a base image setting unit configured to set a base image to be combined with an image captured in the multiple exposure shooting mode, from among an image or images recorded on the recording medium,
   wherein, if no base image is set by the base image setting unit and the number of images captured in the multiple exposure shooting mode is less than or equal to one when the multiple exposure shooting ends, the control unit is configured to perform control to prevent the generation unit from generating the multiple combined image or to prevent the second recording control unit from recording the multiple combined image, and
   wherein the first recording control unit is configured to perform control to record the uncombined image regardless of whether the multiple combined image is generated or recorded.

2. The imaging apparatus according to claim 1, wherein, if the base image is set by the base image setting unit even if the number of images captured in the multiple exposure shooting mode is one when the multiple exposure shooting mode ends, the control unit is configured to perform control to allow the generation unit to generate the multiple combined image and to allow the second recording control unit to record the multiple combined image.

3. The imaging apparatus according to claim 1, further comprising a buffer memory configured to store, when the imaging apparatus is operating in the multiple exposure shooting mode, a combined image into which an image or images captured in the multiple exposure shooting mode are combined,
   wherein the control unit is configured to, if the number of images to be combined by the generation unit is one, perform control to prevent the buffer memory from storing the combined image.

4. The imaging apparatus according to claim 1, further comprising a warning unit configured to, if the generation unit has not generated the multiple combined image because the number of images to be combined by the generation unit is one when the multiple exposure shooting ends, issue a warning that the generation unit has not generated the multiple combined image.

5. The imaging apparatus according to claim 1, further comprising a deletion unit configured to, if the generation unit has not generated the multiple combined image or the second recording control unit has not recorded the multiple combined image because the number of images to be combined by the generation unit is one when the multiple exposure shooting mode ends, delete an image captured in the multiple exposure shooting mode from the recording medium.

6. The imaging apparatus according to claim 5, further comprising a receiving unit configured to, if the generation unit has not generated the multiple combined image or the second recording control unit has not recorded the multiple combined image because the number of images to be combined by the generation unit is one when the multiple exposure shooting ends, receive a selection of whether the deletion unit deletes the image captured in the multiple exposure shooting mode.

7. The imaging apparatus according to claim 1, further comprising a registration unit configured to, if the generation unit has not generated the multiple combined image or the second recording control unit has not recorded the multiple combined image because the number of images to be combined by the generation unit is one when the multiple exposure shooting ends, register an image captured in the multiple exposure shooting mode as a candidate to be displayed first when the base image is selected for image capturing in the multiple exposure shooting mode next time.

8. A method for controlling an imaging apparatus, the method comprising:

performing control to record an uncombined image captured in a multiple exposure shooting mode on a recording medium;

combining an image or images captured in the multiple exposure shooting mode to generate a multiple combined image to be recorded on the recording medium;

performing control to record the multiple combined image on the recording medium;

performing, if a number of images to be combined is one when multiple exposure shooting ends, control to prevent the multiple combined image from being generated or recorded; and setting a base image to be combined with an image captured in the multiple exposure shooting mode, from among an image or images recorded on the recording medium, wherein, if no base image is set and a number of images captured in the multiple exposure shooting mode is less than or equal to one when the multiple exposure shooting ends, performing control to prevent the multiple combined image from being generated or recorded, and wherein control is performed to record the uncombined image regardless of whether the multiple combined image is generated or recorded.

9. A non-transitory computer-readable storage medium storing a program that causes a computer to function as each step of the method according to claim 8.

10. The imaging apparatus according to claim 1, further comprising an image capturing unit configured to capture an image in response to a predetermined operation being performed on an operation unit, wherein, in the multiple exposure shooting mode, the image capturing unit is configured to capture one image in response to the predetermined operation being performed once.

\* \* \* \* \*